US012438587B2

(12) United States Patent
Medina et al.

(10) Patent No.: US 12,438,587 B2
(45) Date of Patent: Oct. 7, 2025

(54) ENHANCED BEAM SELECTION FOR NR SIDELINK COMMUNICATION IN FR2

(71) Applicant: Nokia Technologies Oy, Espoo (FI)

(72) Inventors: Daniel Medina, Munich (DE); Torsten Wildschek, Gloucester (GB); Nuno Manuel Kiilerich Pratas, Aalborg (DK); Stepan Kucera, Munich (DE); Jun Tan, Naperville, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 72 days.

(21) Appl. No.: 18/508,929

(22) Filed: Nov. 14, 2023

(65) Prior Publication Data
US 2024/0171250 A1 May 23, 2024

Related U.S. Application Data

(60) Provisional application No. 63/427,500, filed on Nov. 23, 2022.

(51) Int. Cl.
H04B 7/06 (2006.01)
H04B 17/318 (2015.01)

(52) U.S. Cl.
CPC ......... H04B 7/0695 (2013.01); H04B 17/318 (2015.01)

(58) Field of Classification Search
CPC ............................ H04B 7/0695; H04B 17/318
See application file for complete search history.

(56) References Cited

U.S. PATENT DOCUMENTS 11,818,749 B2 * 11/2023 Ryu ................. H04W 72/566
2020/0028742 A1 * 1/2020 Ren ................. H04W 72/044
(Continued)

FOREIGN PATENT DOCUMENTS

EP 1801999 A1 6/2007
WO 2022/155514 A1 7/2022

OTHER PUBLICATIONS

Extended European Search Report received for corresponding European Patent Application No. 23210511.4, dated Aug. 29, 2024, 19 pages.
(Continued)

Primary Examiner — Jaison Joseph
(74) Attorney, Agent, or Firm — SQUIRE PATTON BOGGS (US) LLP

(57) ABSTRACT

Embodiments of the present disclosure provide for selecting a first candidate beam for communication with a first transmitter (Tx) user equipment (UE) and a second candidate beam for communication with a second Tx UE; determining a first radio resource expected to be used by the first Tx UE for a first radio transmission to a receiver UE and a second radio resource expected to be used by the second Tx UE for a second radio transmission to the receiver UE; determining that the first radio resource overlaps in time with the second radio resource, and that the first candidate beam does not match the second candidate beam; and determining whether to: receive the first radio transmission using the first candidate beam, receive the second radio transmission using the second candidate beam, or receive the first radio transmission and the second radio transmission using a third candidate beam.

18 Claims, 11 Drawing Sheets

(56) References Cited

U.S. PATENT DOCUMENTS

| | | | |
|---|---|---|---|
| 2021/0076279 A1* | 3/2021 | Awoniyi-Oteri | H04W 36/085 |
| 2021/0235307 A1* | 7/2021 | Venugopal | H04B 7/0617 |
| 2022/0271887 A1* | 8/2022 | Zhang | H04L 5/0051 |
| 2023/0170977 A1* | 6/2023 | Zhu | H04W 52/367 |
| | | | 375/267 |
| 2023/0262819 A1* | 8/2023 | Karimidehkordi | H04B 7/088 |
| | | | 370/329 |
| 2023/0370146 A1* | 11/2023 | Wang | H04W 76/19 |
| 2024/0137754 A1* | 4/2024 | Balasubramanian | H04W 8/22 |
| 2024/0171250 A1* | 5/2024 | Medina | H04B 7/088 |
| 2025/0039846 A1* | 1/2025 | Medina | H04W 72/40 |

OTHER PUBLICATIONS

"Enhancements on beam management for multi-TRP", 3GPP TSG RAN WG1 Meeting #103-e, R1-2009253, Agenda item : 8.1.2.3, Qualcomm Incorporated, Oct. 26-Nov. 13, 2020, 6 pages.

Partial European Search Report received for corresponding European Patent Application No. 23210511.4, dated Apr. 3, 2024, 15 pages.

"New WID on NR sidelink evolution", 3GPP TSG RAN Meeting #94e, RP-213678, Agenda: 8.6.1, OPPO, Dec. 6-17, 2021, 6 pages.

Medina et al., "Interference-Aware Dynamic Resource Allocation for D2D Proximity Services with Beamforming Support", IEEE Global Communications Conference (GLOBECOM), Dec. 6-10, 2015, 7 pages.

Bao et al., "Transmission Scheduling in Ad Hoc Networks with Directional Antennas", MobiCom '02: Proceedings of the 8th annual international conference on Mobile computing and networking, Sep. 2002, 11 pages.

"3rd Generation Partnership Project; Technical Specification Group Radio Access Network; NR; Physical layer procedures for control (Release 17)", 3GPP TS 38.213, V17.2.0, Jun. 2022, pp. 1-256.

"3rd Generation Partnership Project; Technical Specification Group Radio Access Network; NR; Physical layer procedures for data (Release 17)", 3GPP TS 38.214, V17.2.0, Jun. 2022, pp. 1-228.

* cited by examiner

| min(RSRP$_{k,1}$, RSRP$_{k,2}$) | RSRP for UE B1 (k, 1) | RSRP for UE B2 (k, 2) | Candidate beam (value of k) |
|---|---|---|---|
| 496 | RSRP$_{1,1}$ = 496 | RSRP$_{1,2}$ = 746 | 1 |
| 78 | RSRP$_{2,1}$ = 78 | RSRP$_{2,2}$ = 878 | 2 |
| 571 | RSRP$_{3,1}$ = 744 | RSRP$_{3,2}$ = 571 | 3 |
| 233 | RSRP$_{4,1}$ = 233 | RSRP$_{4,2}$ = 311 | 4 |
| 510 | RSRP$_{5,1}$ = 510 | RSRP$_{5,2}$ = 800 | 5 |

FIG. 6A

| min(RSRP$_{k,1}$, RSRP$_{k,2}$) | RSRP for UE A1 (k, 1) | RSRP for UE A2 (k, 2) | Candidate beam (value of k) |
|---|---|---|---|
| 496 | RSRP$_{1,1}$ = 496 | RSRP$_{1,2}$ = 746 | 1 |
| 78 | RSRP$_{2,1}$ = 78 | RSRP$_{2,2}$ = 878 | 2 |
| 571 | RSRP$_{3,1}$ = 744 | RSRP$_{3,2}$ = 571 | 3 |
| 233 | RSRP$_{4,1}$ = 233 | RSRP$_{4,2}$ = 311 | 4 |
| 510 | RSRP$_{5,1}$ = 510 | RSRP$_{5,2}$ = 800 | 5 |

FIG. 6B

ENHANCED BEAM SELECTION FOR NR SIDELINK COMMUNICATION IN FR2

RELATED APPLICATION

This application claims priority to, and the benefit of, U.S. Provisional Application No. 63/427,500, filed on Nov. 23, 2022, the contents of which is incorporated herein by reference in its entirety.

TECHNICAL FIELD

The examples and non-limiting example embodiments relate generally to communications and, more particularly, to enhanced beam selection for NR sidelink communication in FR2.

BACKGROUND

It is known to facilitate communications between mobile devices in a communication network.

SUMMARY

The following summary is illustrative and lists examples based on the disclosed embodiments.

Example 1. An apparatus includes: at least one processor; and at least one memory storing instructions that, when executed by the at least one processor, cause the apparatus at least to: select a first candidate beam for communication with a first transmitter user equipment; select a second candidate beam for communication with a second transmitter user equipment; determine a first radio resource expected to be used by the first transmitter user equipment for a first radio transmission to a receiver user equipment; determine a second radio resource expected to be used by the second transmitter user equipment for a second radio transmission to the receiver user equipment; determine that the first radio resource overlaps in time, at least partially, with the second radio resource, and determine that the first candidate beam does not match the second candidate beam; and determine whether to: receive the first radio transmission using the first candidate beam, receive the second radio transmission using the second candidate beam, or receive the first radio transmission and the second radio transmission using a third candidate beam.

Example 2. The apparatus of example 1, wherein the instructions, when executed by the at least one processor, cause the apparatus to: determine to receive the first radio transmission from the first transmitter user equipment using the first candidate beam when the first radio transmission of the first transmitter user equipment has a higher priority than the second radio transmission of the second transmitter user equipment; and determine to receive the second radio transmission from the second transmitter user equipment using the second candidate beam when the second radio transmission of the second transmitter user equipment has a higher priority than the first radio transmission of the first transmitter user equipment.

Example 3. The apparatus of any of examples 1 to 2, wherein the instructions, when executed by the at least one processor, cause the apparatus to: determine, based on measurements using a plurality of candidate beams of the receiver user equipment, a first plurality of received signal strengths associated with the first transmitter user equipment and a second plurality of received signal strengths associated with the second transmitter user equipment; and select the third candidate beam for reception of both the first radio transmission from the first transmitter user equipment and the second radio transmission from the second transmitter user equipment, wherein the beam selection is based on both the first plurality of received signal strengths and the second plurality of received signal strengths.

Example 4. The apparatus of example 3, wherein the instructions, when executed by the at least one processor, cause the apparatus at least to: determine, for the plurality of candidate beams, a respective plurality of smaller received signal strengths of a respective first received signal strength of the first plurality of received signal strengths associated with the first transmitter user equipment and a respective second received signal strength of the second plurality of received signal strengths associated with the second transmitter user equipment; determine a larger received signal strength of the plurality of smaller received signal strengths; and select a beam for reception of both the first radio transmission from the first transmitter user equipment and the second radio transmission from the second transmitter user equipment that is associated with the larger received signal strength of the plurality of smaller received signal strengths.

Example 5. The apparatus of any of examples 1 to 4, wherein the instructions, when executed by the at least one processor, cause the apparatus at least to: select the third candidate beam for reception of both the first radio transmission from the first transmitter user equipment and the second radio transmission from the second transmitter user equipment, based at least partially on the determination that the first candidate beam does not match the second candidate beam.

Example 6. The apparatus of any of examples 1 to 5, wherein the instructions, when executed by the at least one processor, cause the apparatus at least to: select the third candidate beam for reception of both the first radio transmission from the first transmitter user equipment and the second radio transmission from the second transmitter user equipment, based at least partially on the determination that the first radio resource overlaps in time, at least partially, with the second radio resource.

Example 7. The apparatus of any of examples 1 to 6, wherein the instructions, when executed by the at least one processor, cause the apparatus at least to: select the third candidate beam for reception of both the first radio transmission from the first transmitter user equipment and the second radio transmission from the second transmitter user equipment, based at least partially on the receiver user equipment being incapable of simultaneously receiving with both the first candidate beam and the second candidate beam.

Example 8. The apparatus of any of examples 1 to 7, wherein the instructions, when executed by the at least one processor, cause the apparatus at least to: select a beam for reception of the first radio transmission and the second radio transmission based at least partially on at least one of: a first priority of the first radio transmission and a second priority of the second radio transmission; an angular distance between a first expected angle-of-arrival of the first radio transmission and a second expected angle-of-arrival of the second radio transmission; or a first expected interference in the first radio resource expected to be used by the first transmitter user equipment or a second expected interference in the second radio resource expected to be used by the second transmitter user equipment.

Example 9. The apparatus of any of examples 1 to 8, wherein the instructions, when executed by the at least one processor, cause the apparatus at least to: select a beam for reception of both the first radio transmission from the first transmitter user equipment and the second radio transmission from the second transmitter user equipment based at least partially on whether a respective first received signal strength of a first plurality of received signal strengths associated with the first transmitter user equipment is lower or higher than a first threshold, or whether a respective second received signal strength of a second plurality of received signal strengths associated with the second transmitter user equipment is lower or higher than a second threshold.

Example 10. The apparatus of example 9, wherein the instructions, when executed by the at least one processor, cause the apparatus at least to: discard a respective beam associated with the respective first received signal strength of the first plurality of received signal strengths associated with the first transmitter user equipment from a plurality of candidate beams, when the respective first received signal strength is lower than the first threshold; and discard a respective beam associated with the respective second received signal strength of the second plurality of received signal strengths associated with the second transmitter user equipment from the plurality of candidate beams, when the respective second received signal strength is lower than the second threshold.

Example 11. The apparatus of any of examples 1 to 10, wherein the instructions, when executed by the at least one processor, cause the apparatus at least to: select the third candidate beam for reception of both the first radio transmission from the first transmitter user equipment and the second radio transmission from the second transmitter user equipment, based at least partially on a receiver user equipment receiving with insufficient received signal strength from the second transmitter user equipment with the first candidate beam of the receiver user equipment for communication with the first transmitter user equipment, or receiving with an insufficient received signal strength from the first transmitter user equipment with the second candidate beam of the receiver user equipment for communication with the second transmitter user equipment.

Example 12. The apparatus of any of examples 1 to 11, wherein the apparatus comprises the receiver user equipment.

Example 13. An apparatus includes: at least one processor; and at least one memory storing instructions that, when executed by the at least one processor, cause the apparatus at least to: select a first candidate beam for communication with a first receiver user equipment; select a second candidate beam for communication with a second receiver user equipment; determine a first radio resource for transmitting a first radio transmission to the first receiver user equipment; determine a second radio resource for transmitting a second radio transmission to the second receiver user equipment; determine that the first radio resource overlaps in time, at least partially, with the second radio resource, and determine that the first candidate beam does not match the second candidate beam; and determine whether to: transmit the first radio transmission using the first candidate beam, transmit the second radio transmission using the second candidate beam, or transmit the first radio transmission and the second radio transmission using a third candidate beam.

Example 14. The apparatus of example 13, wherein the instructions, when executed by the at least one processor, cause the apparatus to: determine to transmit the first radio transmission to the first receiver user equipment using the first candidate beam when the first radio transmission to the first receiver user equipment has a higher priority than the second radio transmission to the second receiver user equipment; and determine to transmit the second radio transmission to the second receiver user equipment using the second candidate beam when the second radio transmission to the second receiver user equipment has a higher priority than the first radio transmission to the first receiver user equipment.

Example 15. The apparatus of any of examples 13 to 14, wherein the instructions, when executed by the at least one processor, cause the apparatus to: determine, based on measurements using a plurality of candidate beams of a transmitter user equipment, a first plurality of received signal strengths associated with the first receiver user equipment and a second plurality of received signal strengths associated with the second receiver user equipment; and select the third candidate beam for transmission of both the first radio transmission to the first receiver user equipment and the second radio transmission to the second receiver user equipment, wherein the beam selection is based on both the first plurality of received signal strengths and the second plurality of received signal strengths.

Example 16. The apparatus of example 15, wherein the instructions, when executed by the at least one processor, cause the apparatus at least to: determine, for the plurality of candidate beams, a respective plurality of smaller received signal strengths of a respective first received signal strength of the first plurality of received signal strengths associated with the first receiver user equipment and a respective second received signal strength of the second plurality of received signal strengths associated with the second receiver user equipment; determine a larger received signal strength of the plurality of smaller received signal strengths; and select a beam for transmission of both the first radio transmission to the first receiver user equipment and the second radio transmission to the second receiver user equipment that is associated with the larger received signal strength of the plurality of smaller received signal strengths.

Example 17. The apparatus of any of examples 13 to 16, wherein the instructions, when executed by the at least one processor, cause the apparatus at least to: select the third candidate beam for transmission of both the first radio transmission to the first receiver user equipment and the second radio transmission to the second receiver user equipment, based at least partially on the determination that the first candidate beam does not match the second candidate beam.

Example 18. The apparatus of any of examples 13 to 17, wherein the instructions, when executed by the at least one processor, cause the apparatus at least to: select the third candidate beam for transmission of both the first radio transmission to the first receiver user equipment and the second radio transmission to the second receiver user equipment, based at least partially on the determination that the first radio resource overlaps in time, at least partially, with the second radio resource.

Example 19. The apparatus of any of examples 13 to 18, wherein the instructions, when executed by the at least one processor, cause the apparatus at least to: select the third candidate beam for transmission of both the first radio transmission to the first receiver user equipment and the second radio transmission to the second receiver user equipment, based at least partially on the transmitter user equipment being incapable of simultaneously transmitting with both the first candidate beam and the second candidate beam.

Example 20. The apparatus of any of examples 13 to 19, wherein the instructions, when executed by the at least one processor, cause the apparatus at least to: select a beam for transmission of the first radio transmission and the second radio transmission based at least partially on at least one of: a first priority of the first radio transmission and a second priority of the second radio transmission; an angular distance between a first expected angle-of-departure of the first radio transmission and a second expected angle-of-departure of the second radio transmission; or a first expected interference in the first radio resource for transmitting the first radio transmission to the first receiver user equipment or a second expected interference in the second radio resource for transmitting the second radio transmission to the second receiver user equipment.

Example 21. The apparatus of any of examples 13 to 20, wherein the instructions, when executed by the at least one processor, cause the apparatus at least to: select a beam for transmission of both the first radio transmission to the first receiver user equipment and the second radio transmission to the second receiver user equipment based at least partially on whether a respective first received signal strength of a first plurality of received signal strengths associated with the first receiver user equipment is lower or higher than a first threshold, or whether a respective second received signal strength of a second plurality of received signal strengths associated with the second receiver user equipment is lower or higher than a second threshold.

Example 22. The apparatus of example 21, wherein the instructions, when executed by the at least one processor, cause the apparatus at least to: discard a respective beam associated with the respective first received signal strength of the first plurality of received signal strengths associated with the first receiver user equipment from a plurality of candidate beams, when the respective first received signal strength is lower than the first threshold; and discard a respective beam associated with the respective second received signal strength of the second plurality of received signal strengths associated with the second receiver user equipment from the plurality of candidate beams, when the respective second received signal strength is lower than the second threshold.

Example 23. The apparatus of any of examples 13 to 22, wherein the instructions, when executed by the at least one processor, cause the apparatus at least to: select the third candidate beam for transmission of both the first radio transmission to the first receiver user equipment and the second radio transmission to the second receiver user equipment, based at least partially on the second receiver user equipment receiving with an insufficient received signal strength with the first candidate beam of the transmitter user equipment for communication with the first receiver user equipment, or the first receiver user equipment receiving with an insufficient received signal strength with the second candidate beam of the transmitter user equipment for communication with the second receiver user equipment.

Example 24. The apparatus of any of examples 13 to 23, wherein the apparatus comprises a transmitter user equipment.

Example 25. An apparatus includes: at least one processor; and at least one memory storing instructions that, when executed by the at least one processor, cause the apparatus at least to: select a beam for reception of both a first radio transmission from a first transmitter user equipment and a second radio transmission from a second transmitter user equipment; wherein the selection of the beam for reception of both the first radio transmission from the first transmitter user equipment and the second radio transmission from the second transmitter user equipment is based at least partially on a receiver user equipment receiving from the second transmitter user equipment with a first candidate beam of the receiver user equipment for communication with the first transmitter user equipment with a received signal strength lower than a first threshold, or receiving from the first transmitter user equipment with a second candidate beam of the receiver user equipment for communication with the second transmitter user equipment with a received signal strength lower than a second threshold; wherein the apparatus comprises the receiver user equipment; and receive the first radio transmission and the second radio transmission using the selected beam.

Example 26. The apparatus of example 25, wherein the instructions, when executed by the at least one processor, cause the apparatus at least to: determine, based on measurements using a plurality of candidate beams of the receiver user equipment, a first plurality of received signal strengths associated with the first transmitter user equipment and a second plurality of received signal strengths associated with the second transmitter user equipment; wherein the beam selection is based on both the first plurality of received signal strengths and the second plurality of received signal strengths.

Example 27. The apparatus of example 26, wherein the instructions, when executed by the at least one processor, cause the apparatus at least to: determine, for the plurality of candidate beams, a respective plurality of smaller received signal strengths of a respective first received signal strength of the first plurality of received signal strengths associated with the first transmitter user equipment and a respective second received signal strength of the second plurality of received signal strengths associated with the second transmitter user equipment; determine a larger received signal strength of the plurality of smaller received signal strengths; and wherein the beam selected for reception of both the first radio transmission from the first transmitter user equipment and the second radio transmission from the second transmitter user equipment is associated with the larger received signal strength of the plurality of smaller received signal strengths.

Example 28. The apparatus of any of examples 25 to 27, wherein the selection of the beam for reception is based at least partially on at least one of: a first priority of the first radio transmission and a second priority of the second radio transmission; an angular distance between a first expected angle-of-arrival of the first radio transmission and a second expected angle-of-arrival of the second radio transmission; or a first expected interference in a first radio resource associated with the first radio transmission or a second expected interference in a second radio resource associated with the second radio transmission.

Example 29. The apparatus of any of examples 25 to 28, wherein the selection of the beam for reception of both the first radio transmission from the first transmitter user equipment and the second radio transmission from the second transmitter user equipment is based at least partially on whether a respective first received signal strength of a first plurality of received signal strengths associated with the first transmitter user equipment is lower or higher than a third threshold, or whether a respective second received signal strength of a second plurality of received signal strengths associated with the second transmitter user equipment is lower or higher than a fourth threshold.

Example 30. The apparatus of example 29, wherein the first threshold is the third threshold, and the second threshold is the fourth threshold.

Example 31. The apparatus of any of examples 29 to 30, wherein the instructions, when executed by the at least one processor, cause the apparatus at least to: discard a respective beam associated with the respective first received signal strength of the first plurality of received signal strengths associated with the first transmitter user equipment from a plurality of candidate beams, when the respective first received signal strength is lower than the third threshold; and discard a respective beam associated with the respective second received signal strength of the second plurality of received signal strengths associated with the second transmitter user equipment from the plurality of candidate beams, when the respective second received signal strength is lower than the fourth threshold.

Example 32. An apparatus includes: at least one processor; and at least one memory storing instructions that, when executed by the at least one processor, cause the apparatus at least to: select a beam for transmission of both a first radio transmission to a first receiver user equipment and a second radio transmission to a second receiver user equipment; wherein the selection of the beam for transmission of both the first radio transmission to the first receiver user equipment and the second radio transmission to the second receiver user equipment is based at least partially on the second receiver user equipment receiving with a first candidate beam of a transmitter user equipment for communication with the first receiver user equipment with a received signal strength lower than a first threshold, or the first receiver user equipment receiving with a second candidate beam of the transmitter user equipment for communication with the second receiver user equipment with a received signal strength lower than a second threshold; wherein the apparatus comprises the transmitter user equipment; and transmit the first radio transmission and the second radio transmission using the selected beam.

Example 33. The apparatus of example 32, wherein the instructions, when executed by the at least one processor, cause the apparatus at least to: determine, based on measurements using a plurality of candidate beams of the transmitter user equipment, a first plurality of received signal strengths associated with the first receiver user equipment and a second plurality of received signal strengths associated with the second receiver user equipment; wherein the beam selection is based on both the first plurality of received signal strengths and the second plurality of received signal strengths.

Example 34. The apparatus of example 33, wherein the instructions, when executed by the at least one processor, cause the apparatus at least to: determine, for the plurality of candidate beams, a respective plurality of smaller received signal strengths of a respective first received signal strength of the first plurality of received signal strengths associated with the first receiver user equipment and a respective second received signal strength of the second plurality of received signal strengths associated with the second receiver user equipment; determine a larger received signal strength of the plurality of smaller received signal strengths; and wherein the beam selected for transmission of both the first radio transmission to the first receiver user equipment and the second radio transmission to the second receiver user equipment is associated with the larger received signal strength of the plurality of smaller received signal strengths.

Example 35. The apparatus of any of examples 32 to 34, wherein the selection of the beam for reception is based at least partially on at least one of: a first priority of the first radio transmission and a second priority of the second radio transmission; an angular distance between a first expected angle-of-departure of the first radio transmission and a second expected angle-of-departure of the second radio transmission; or a first expected interference in a first radio resource associated with the first radio transmission or a second expected interference in a second radio resource associated with the second radio transmission.

Example 36. The apparatus of any of examples 32 to 35, wherein the selection of the beam for transmission of both the first radio transmission to the first receiver user equipment and the second radio transmission to the second receiver user equipment is based at least partially on whether a respective first received signal strength of a first plurality of received signal strengths associated with the first receiver user equipment is lower or higher than a third threshold, or whether a respective second received signal strength of a second plurality of received signal strengths associated with the second receiver user equipment is lower or higher than a fourth threshold.

Example 37. The apparatus of example 36, wherein the first threshold is the third threshold, and the second threshold is the fourth threshold.

Example 38. The apparatus of any of examples 36 to 37, wherein the instructions, when executed by the at least one processor, cause the apparatus at least to: discard a respective beam associated with the respective first received signal strength of the first plurality of received signal strengths associated with the first receiver user equipment from a plurality of candidate beams, when the respective first received signal strength is lower than the third threshold; and discard a respective beam associated with the respective second received signal strength of the second plurality of received signal strengths associated with the second receiver user equipment from the plurality of candidate beams, when the respective second received signal strength is lower than the fourth threshold.

Example 39. A method includes: selecting a first candidate beam for communication with a first transmitter user equipment; selecting a second candidate beam for communication with a second transmitter user equipment; determining a first radio resource expected to be used by the first transmitter user equipment for a first radio transmission to a receiver user equipment; determining a second radio resource expected to be used by the second transmitter user equipment for a second radio transmission to the receiver user equipment; determining that the first radio resource overlaps in time, at least partially, with the second radio resource, and determine that the first candidate beam does not match the second candidate beam; and determining whether to: receive the first radio transmission using the first candidate beam, receive the second radio transmission using the second candidate beam, or receive the first radio transmission and the second radio transmission using a third candidate beam.

Example 40. A method includes: selecting a first candidate beam for communication with a first receiver user equipment; selecting a second candidate beam for communication with a second receiver user equipment; determining a first radio resource for transmitting a first radio transmission to the first receiver user equipment; determining a second radio resource for transmitting a second radio transmission to the second receiver user equipment; determining that the first radio resource overlaps in time, at least partially, with the second radio resource, and determine that the first candidate beam does not match the second candidate beam; and determining whether to: transmit the first radio transmission using the first candidate beam, transmit the second radio transmission using the second candidate beam, or transmit the first radio transmission and the second radio transmission using a third candidate beam.

Example 41. A method includes: selecting a beam for reception of both a first radio transmission from a first transmitter user equipment and a second radio transmission from a second transmitter user equipment; wherein the selection of the beam for reception of both the first radio transmission from the first transmitter user equipment and the second radio transmission from the second transmitter user equipment is based at least partially on a receiver user equipment receiving from the second transmitter user equipment with a first candidate beam of the receiver user equipment for communication with the first transmitter user equipment with a received signal strength lower than a first threshold, or receiving from the first transmitter user equipment with a second candidate beam of the receiver user equipment for communication with the second transmitter user equipment with a received signal strength lower than a second threshold; wherein the apparatus comprises the receiver user equipment; and receiving the first radio transmission and the second radio transmission using the selected beam.

Example 42. A method includes: selecting a beam for transmission of both a first radio transmission to a first receiver user equipment and a second radio transmission to a second receiver user equipment; wherein the selection of the beam for transmission of both the first radio transmission to the first receiver user equipment and the second radio transmission to the second receiver user equipment is based at least partially on the second receiver user equipment receiving with a first candidate beam of a transmitter user equipment for communication with the first receiver user equipment with a received signal strength lower than a first threshold, or the first receiver user equipment receiving with a second candidate beam of the transmitter user equipment for communication with the second receiver user equipment with a received signal strength lower than a second threshold; wherein the apparatus comprises the transmitter user equipment; and transmitting the first radio transmission and the second radio transmission using the selected beam.

Example 43. An apparatus includes: means for selecting a first candidate beam for communication with a first transmitter user equipment; means for selecting a second candidate beam for communication with a second transmitter user equipment; means for determining a first radio resource expected to be used by the first transmitter user equipment for a first radio transmission to a receiver user equipment; means for determining a second radio resource expected to be used by the second transmitter user equipment for a second radio transmission to the receiver user equipment; means for determining that the first radio resource overlaps in time, at least partially, with the second radio resource, and determine that the first candidate beam does not match the second candidate beam; and means for determining whether to: receive the first radio transmission using the first candidate beam, receive the second radio transmission using the second candidate beam, or receive the first radio transmission and the second radio transmission using a third candidate beam.

Example 44. An apparatus includes: means for selecting a first candidate beam for communication with a first receiver user equipment; means for selecting a second candidate beam for communication with a second receiver user equipment; means for determining a first radio resource for transmitting a first radio transmission to the first receiver user equipment; means for determining a second radio resource for transmitting a second radio transmission to the second receiver user equipment; means for determining that the first radio resource overlaps in time, at least partially, with the second radio resource, and determine that the first candidate beam does not match the second candidate beam; and means for determining whether to: transmit the first radio transmission using the first candidate beam, transmit the second radio transmission using the second candidate beam, or transmit the first radio transmission and the second radio transmission using a third candidate beam.

Example 45. An apparatus includes: means for selecting a beam for reception of both a first radio transmission from a first transmitter user equipment and a second radio transmission from a second transmitter user equipment; wherein the selection of the beam for reception of both the first radio transmission from the first transmitter user equipment and the second radio transmission from the second transmitter user equipment is based at least partially on a receiver user equipment receiving from the second transmitter user equipment with a first candidate beam of the receiver user equipment for communication with the first transmitter user equipment with a received signal strength lower than a first threshold, or receiving from the first transmitter user equipment with a second candidate beam of the receiver user equipment for communication with the second transmitter user equipment with a received signal strength lower than a second threshold; wherein the apparatus comprises the receiver user equipment; and means for receiving the first radio transmission and the second radio transmission using the selected beam.

Example 46. An apparatus includes: means for selecting a beam for transmission of both a first radio transmission to a first receiver user equipment and a second radio transmission to a second receiver user equipment; wherein the selection of the beam for transmission of both the first radio transmission to the first receiver user equipment and the second radio transmission to the second receiver user equipment is based at least partially on the second receiver user equipment receiving with a first candidate beam of a transmitter user equipment for communication with the first receiver user equipment with a received signal strength lower than a first threshold, or the first receiver user equipment receiving with a second candidate beam of the transmitter user equipment for communication with the second receiver user equipment with a received signal strength lower than a second threshold; wherein the apparatus comprises the transmitter user equipment; and means for transmitting the first radio transmission and the second radio transmission using the selected beam.

Example 47. A non-transitory program storage device readable by a machine, tangibly embodying a program of instructions executable with the machine for performing operations, the operations including: selecting a first candidate beam for communication with a first transmitter user equipment; selecting a second candidate beam for communication with a second transmitter user equipment; determining a first radio resource expected to be used by the first transmitter user equipment for a first radio transmission to a receiver user equipment; determining a second radio resource expected to be used by the second transmitter user equipment for a second radio transmission to the receiver user equipment; determining that the first radio resource overlaps in time, at least partially, with the second radio resource, and determine that the first candidate beam does not match the second candidate beam; and determining whether to: receive the first radio transmission using the first candidate beam, receive the second radio transmission using the second candidate beam, or receive the first radio transmission and the second radio transmission using a third candidate beam.

Example 48. A non-transitory program storage device readable by a machine, tangibly embodying a program of instructions executable with the machine for performing operations, the operations including: selecting a first candidate beam for communication with a first receiver user equipment; selecting a second candidate beam for communication with a second receiver user equipment; determining a first radio resource for transmitting a first radio transmission to the first receiver user equipment; determining a second radio resource for transmitting a second radio transmission to the second receiver user equipment; determining that the first radio resource overlaps in time, at least partially, with the second radio resource, and determine that the first candidate beam does not match the second candidate beam; and determining whether to: transmit the first radio transmission using the first candidate beam, transmit the second radio transmission using the second candidate beam, or transmit the first radio transmission and the second radio transmission using a third candidate beam.

Example 49. A non-transitory program storage device readable by a machine, tangibly embodying a program of instructions executable with the machine for performing operations, the operations including: selecting a beam for reception of both a first radio transmission from a first transmitter user equipment and a second radio transmission from a second transmitter user equipment; wherein the selection of the beam for reception of both the first radio transmission from the first transmitter user equipment and the second radio transmission from the second transmitter user equipment is based at least partially on a receiver user equipment receiving from the second transmitter user equipment with a first candidate beam of the receiver user equipment for communication with the first transmitter user equipment with a received signal strength lower than a first threshold, or receiving from the first transmitter user equipment with a second candidate beam of the receiver user equipment for communication with the second transmitter user equipment with a received signal strength lower than a second threshold; wherein the apparatus comprises the receiver user equipment; and receiving the first radio transmission and the second radio transmission using the selected beam.

Example 50. A non-transitory program storage device readable by a machine, tangibly embodying a program of instructions executable with the machine for performing operations, the operations including: selecting a beam for transmission of both a first radio transmission to a first receiver user equipment and a second radio transmission to a second receiver user equipment; wherein the selection of the beam for transmission of both the first radio transmission to the first receiver user equipment and the second radio transmission to the second receiver user equipment is based at least partially on the second receiver user equipment receiving with a first candidate beam of a transmitter user equipment for communication with the first receiver user equipment with a received signal strength lower than a first threshold, or the first receiver user equipment receiving with a second candidate beam of the transmitter user equipment for communication with the second receiver user equipment with a received signal strength lower than a second threshold; wherein the apparatus comprises the transmitter user equipment; and transmitting the first radio transmission and the second radio transmission using the selected beam.

BRIEF DESCRIPTION OF THE DRAWINGS

The foregoing aspects and other features are explained in the following description, taken in connection with the accompanying drawings.

FIG. 6A shows a concrete example of RSRP values determined for UE B1 and UE B2.

FIG. 6B shows a concrete example of RSRP values determined for UE A1 and UE A2.

DETAILED DESCRIPTION OF EXAMPLE EMBODIMENTS

Figure 1:
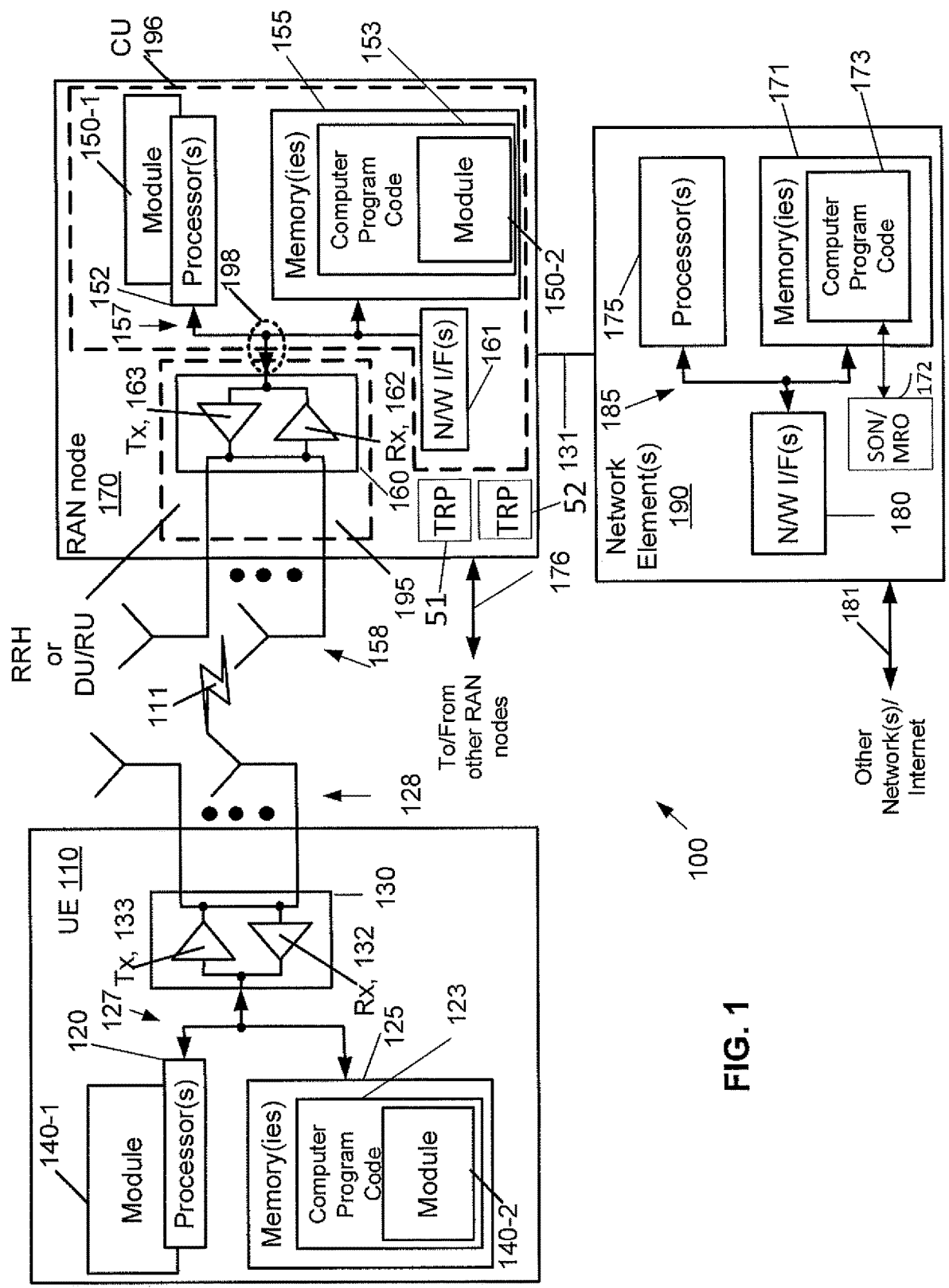
FIG. 1 is a block diagram of one possible and non-limiting system in which the example embodiments may be practiced.

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access for wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface (such as connection 131) to a 5GC (such as, for example, the network element(s) 190). The ng-eNB is a node providing E-UTRA user plane and control plane protocol terminations towards the UE, and connected via the NG interface (such as connection 131) to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that control the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell may be supported with one gNB-DU 195, or one cell may be supported/shared with multiple DUs under RAN sharing. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

A RAN node/gNB can comprise one or more TRPs to which the methods described herein may be applied. FIG. 1 shows that the RAN node 170 comprises two TRPs, TRP 51 and TRP 52. The RAN node 170 may host or comprise other TRPs not shown in FIG. 1.

A relay node in NR is called an integrated access and backhaul node. A mobile termination part of the IAB node facilitates the backhaul (parent link) connection. In other words, the mobile termination part comprises the functionality which carries UE functionalities. The distributed unit part of the IAB node facilitates the so called access link (child link) connections (i.e. for access link UEs, and backhaul for other IAB nodes, in the case of multi-hop IAB). In other words, the distributed unit part is responsible for certain base station functionalities. The IAB scenario may follow the so called split architecture, where the central unit hosts the higher layer protocols to the UE and terminates the control plane and user plane interfaces to the 5G core network.

It is noted that the description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (mobility management entity)/SGW (serving gateway) functionality. Such core network functionality may include SON (self-organizing/optimizing network) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. Computer program code 173 may include SON and/or MRO functionality 172.

The wireless network 100 may implement network virtualization, which is the process of combining hardware and software network resources and network functionality into a single, software-based administrative entity, or a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, non-transitory memory, transitory memory, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback devices having wireless communication capabilities, internet appliances including those permitting wireless internet access and browsing, tablets with wireless communication capabilities, head mounted displays such as those that implement virtual/augmented/mixed reality, as well as portable units or terminals that incorporate combinations of such functions. The UE 110 can also be a vehicle such as a car, or a UE mounted in a vehicle, a UAV such as e.g. a drone, or a UE mounted in a UAV. The user equipment 110 may be terminal device, such as mobile phone, mobile device, sensor device etc., the terminal device being a device used by the user or not used by the user.

UE 110, RAN node 170, and/or network element(s) 190, (and associated memories, computer program code and modules) may be configured to implement (e.g. in part) the methods described herein, including enhanced beam selection for NR sidelink communication in FR2. Thus, computer program code 123, module 140-1, module 140-2, and other elements/features shown in FIG. 1 of UE 110 may implement user equipment related aspects of the examples described herein. Similarly, computer program code 153, module 150-1, module 150-2, and other elements/features shown in FIG. 1 of RAN node 170 may implement gNB/TRP related aspects of the examples described herein. Computer program code 173 and other elements/features shown in FIG. 1 of network element(s) 190 may be configured to implement network element related aspects of the examples described herein.

Having thus introduced a suitable but non-limiting technical context for the practice of the example embodiments, the example embodiments are now described with greater specificity.

Standardization Background

In RAN #94-e, the R18 work item (RP-213678) on sidelink enhancements was approved with the following objectives, including SL operation in FR2 spectrum:

---

3. Study and specify enhanced sidelink operation on FR2 licensed spectrum [RAN1, RAN2, RAN4] (This part of the work is put on hold until further checking in RAN#97)
- Update evaluation methodology for commercial deployment scenario
- Work is limited to the support of sidelink beam management (including initial beam-pairing, beam maintenance, and beam failure recovery, etc) by reusing existing sidelink CSI framework and reusing Uu beam management concepts wherever possible.
    o Beam management in FR2 licensed spectrum considers sidelink unicast communication only.

---

The problem addressed by the examples described herein is illustrated in the figures.

Figure 2:
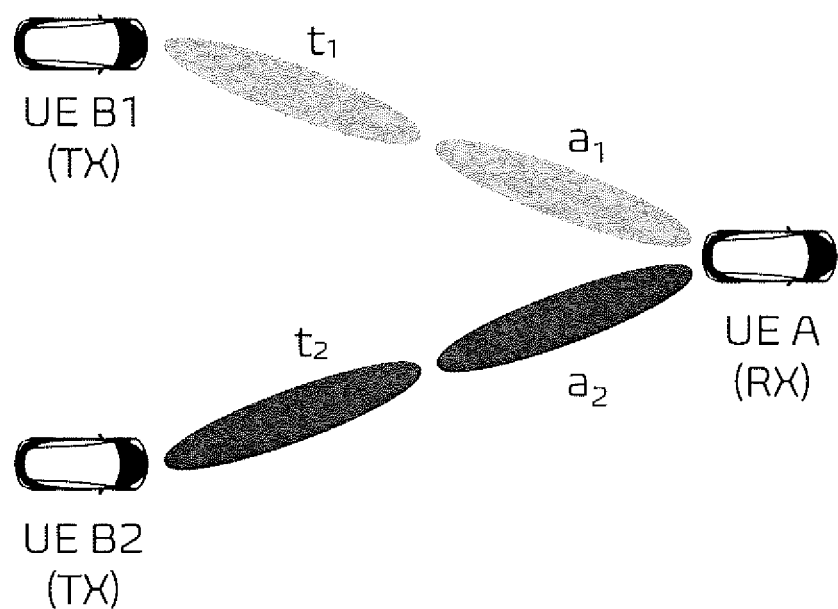
FIG. 2 illustrates that UE A may not be capable of receiving SL on multiple receive beams ($a_1$, $a_2$) simultaneously, therefore at least one SL transmission may be received with insufficient signal quality for successful decoding.

FIG. 2 illustrates two transmitter UEs (B1, B2) in sidelink communication with a same receiver UE (A). A problem may arise when SL transmissions from the transmitter UEs (B1, B2) are received by the receiver UE (A) using directional reception (i.e., not omnidirectionally). For example, the receiver UE (A) may be scheduled to receive, in a first radio resource ($R_1$), a first SL transmission from a first transmitter UE (B1) using a first receive beam ($a_1$). Such first receive beam ($a_1$) may have been determined (e.g., during initial beam pairing) to be the most suitable receive beam among a plurality of candidate beams of the receiver UE (A) for receiving SL transmissions from the first transmitter UE (B1) (e.g., providing a maximum received signal strength, such as RSRP). Similarly, the receiver UE (A) may be scheduled to receive, in a second radio resource ($R_2$), a second SL transmission from a second transmitter UE (B2) using a second receive beam ($a_2$). Such second receive beam ($a_2$) may have been determined (e.g., during initial beam pairing) to be the most suitable receive beam among a plurality of candidate beams of the receiver UE (A) for receiving SL transmissions from the second transmitter UE (B2) (e.g., providing a maximum received signal strength, such as RSRP). If the first and second radio resources ($R_1$, $R_2$) overlap in the time domain and the first and second receive beams ($a_1$, $a_2$) do not match, a receiver UE (A) that is not capable of simultaneously using multiple receive beams ($a_1$, $a_2$) may need to choose either the first ($a_1$) or the second ($a_2$) receive beam (e.g., based on an associated transmission priority), possibly resulting in one of the SL transmissions being received with insufficient signal quality for successful decoding.

Thus in FIG. 2, UE A may not be capable of receiving SL on multiple receive beams ($a_1$, $a_2$) simultaneously, therefore at least one SL transmission may be received with insufficient signal quality for successful decoding. FIG. 2 further shows transmit beam ($t_1$) of UE B1 and transmit beam ($t_2$) of UE B2.

Figure 3:
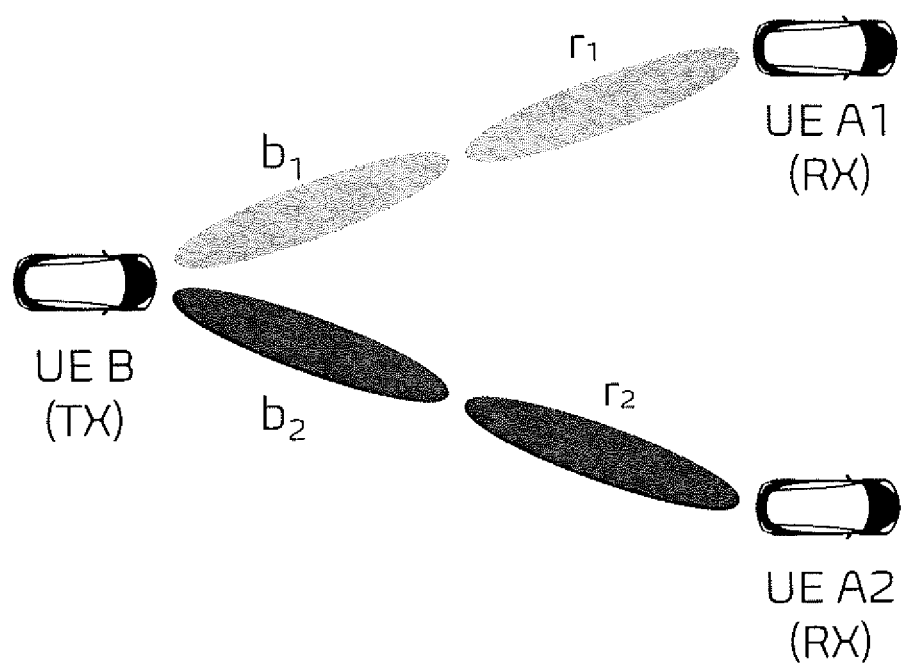
FIG. 3 illustrates that UE B may not be capable of transmitting SL on multiple transmit beams ($b_1$, $b_2$) simultaneously, therefore at least one SL transmission may be received with insufficient signal quality for successful decoding.

As shown in FIG. 3, a similar problem may arise when SL transmissions from a same transmitter UE (B) are transmitted to respective receiver UEs (A1, A2) using directional transmission (i.e., not omnidirectionally). For example, the transmitter UE (B) may determine a first radio resource ($R_1$) for a first SL transmission to a first receiver UE (A1) using a first transmit beam ($b_1$). Such first transmit beam ($b_1$) may have been determined (e.g., during initial beam pairing) to be the most suitable transmit beam among a plurality of candidate beams of the transmitter UE (B) for transmitting SL transmissions to the first receiver UE (A1) (e.g., providing a maximum received signal strength, such as RSRP). Similarly, the transmitter UE (B) may determine a second radio resource ($R_2$) for a second SL transmission to a second receiver UE (A2) using a second transmit beam ($b_2$). Such second transmit beam ($b_2$) may have been determined (e.g., during initial beam pairing) to be the most suitable transmit beam among a plurality of candidate beams of the transmitter UE (B) for transmitting SL transmissions to the second receiver UE (A2) (e.g., providing a maximum received signal strength, such as RSRP). If the first and second radio resources ($R_1$, $R_2$) overlap in the time domain and the first and second transmit beams ($b_1$, $b_2$) do not match, a transmitter UE (B) that is not capable of simultaneously using multiple transmit beams ($b_1$, $b_2$) may need to choose either the first ($b_1$) or the second ($b_2$) transmit beam (e.g., based on an associated transmission priority), possibly resulting in one of the SL transmissions being received with insufficient signal quality for successful decoding.

Thus in FIG. 3. UE B may not be capable of transmitting SL on multiple transmit beams ($b_1$, $b_2$) simultaneously, therefore at least one SL transmission may be received with insufficient signal quality for successful decoding. FIG. 3 further shows receive beam ($r_1$) of UE A1 and receive beam ($r_2$) of UE A2.

The problem described may be avoided by proper transmission scheduling and/or radio resource selection. However, the loss of scheduling flexibility and reduced spatial reuse caused by the UEs' inability to transmit or receive using multiple beams simultaneously is known to reduce system capacity. For example, as described in [Bao and Garcia-Luna-Aceves (2002). Transmission Scheduling in Ad Hoc Networks with Directional Antennas], "Based on more complex DSP technologies than the directional antennas that are capable of forming a single beam, an antenna array, called multi-beam adaptive array (MBAA) capable of forming multiple beams for several simultaneous receptions or transmissions, can even enlarge the capacity of the networks by many folds."

Enhanced Beam Selection for NR Sidelink Communication in FR2

Described herein are mechanisms to address the following issues: A. a receiver UE (A) being unable to receive SL simultaneously on multiple receive beams ($a_1$, $a_2$), and B. a transmitter UE (B) being unable to transmit SL simultaneously on multiple transmit beams ($b_1$, $b_2$).

A. Enhanced Receive Beam Selection at Receiver UE (A)

The first issue, related to a receiver UE (A) being unable to receive SL simultaneously on multiple receive beams ($a_1$, $a_2$), is addressed by enhancing how a receiver UE (A) determines a receive beam for simultaneous reception of multiple SL transmissions from multiple transmitter UEs (B1, B2).

Figure 4:
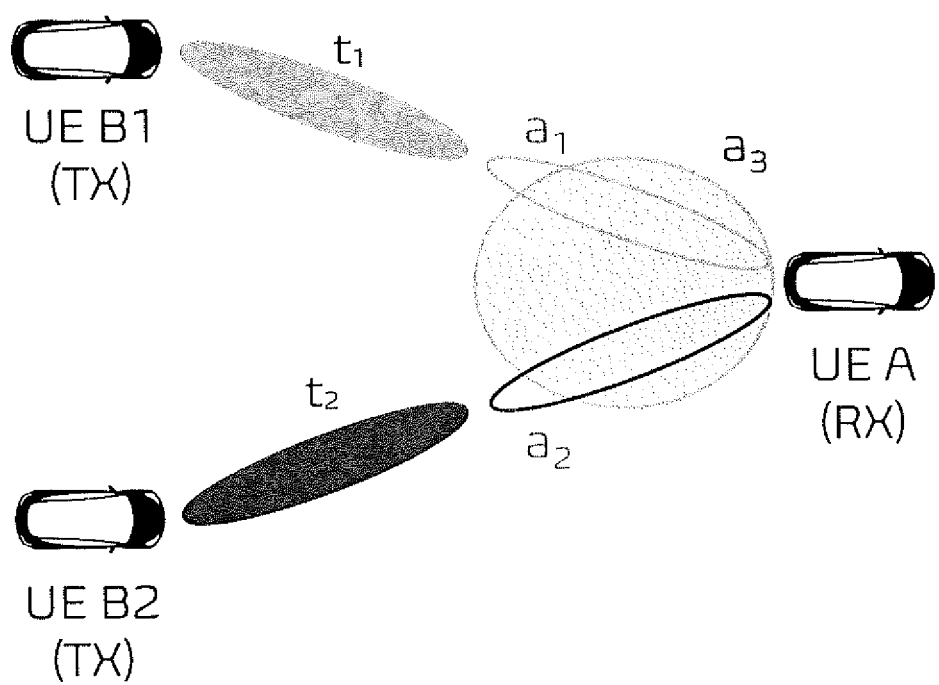
FIG. 4 depicts enhanced receive beam selection at receiver UE (A).

As shown in FIG. 4, the receiver UE (A) may determine a suitable receive beam for simultaneously receiving the first transmission from the first transmitter UE (B1) and the second transmission from the second transmitter UE (B2) by determining, for each candidate beam ($a_k$, k=1, ..., N) of a plurality of candidate beams ($a_1$, ..., $a_N$) of the receiver UE (A), a first received signal strength ($RSRP_{k,1}$, k=1, ..., N) associated with the first transmitter UE (B1) and a second received signal strength ($RSRP_{k,2}$, k=1, ..., N) associated with the second transmitter UE (B2). For example, the receiver UE (A) may determine $RSRP_{k,min}$=min($RSRP_{k,1}$, $RSRP_{k,2}$) for k=1, ..., N, and determine the most suitable receive beam by finding a candidate beam that maximizes $RSRP_{k,min}$ across the plurality of candidate beams ($a_1$, ..., $a_N$), i.e., maximizes the lowest among the first and second received signal strengths.

For example, as shown in FIG. 4, the receiver UE (A) may determine a receive beam ($a_3$) that is wider than the first receive beam ($a_1$) or the second receive beam ($a_2$). Such a wider receive beam ($a_3$) may not be best for receiving the first or second transmissions individually, as the associated received signal strengths ($RSRP_{3,1}$, $RSRP_{3,2}$) may not be the highest possible due to a lower receive antenna gain associated with the wider receive beam ($a_3$). However, the wider receive beam ($a_3$) may allow for simultaneously receiving both transmissions with sufficient signal quality for successful decoding, which may not be possible otherwise. FIG. 4 further shows transmit beam ($t_1$) of UE B1 and transmit beam ($t_2$) of UE B2.

B. Enhanced Transmit Beam Selection at Transmitter UE (B)

The second issue, related to a transmitter UE (B) being unable to transmit SL simultaneously on multiple transmit beams ($b_1$, $b_2$), is addressed by enhancing how a transmitter UE (B) determines a transmit beam for simultaneous transmission of multiple SL transmissions to multiple receiver UEs (A1, A2).

Figure 5:
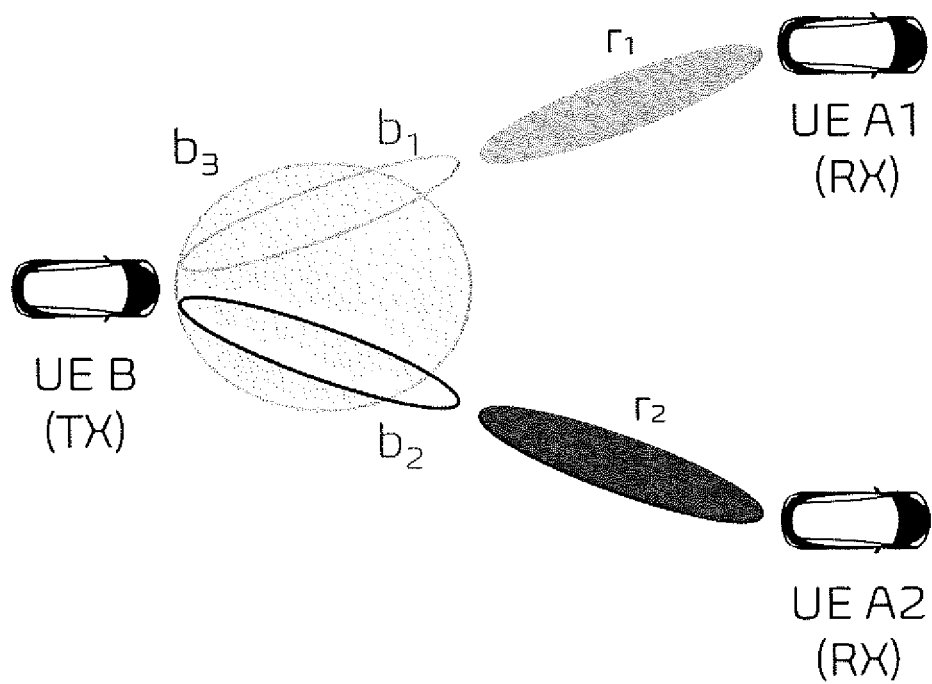
FIG. 5 depicts enhanced transmit beam selection at transmitter UE (B).

As shown in FIG. 5, the transmitter UE (B) may determine a suitable transmit beam for simultaneously transmitting the first transmission to the first receiver UE (A1) and the second transmission to the second receiver UE (A2) by determining, for each candidate beam ($b_k$, k=1, ..., N) of a plurality of candidate beams ($b_1, \ldots, b_N$) of the transmitter UE (B), a first received signal strength ($RSRP_{k,1}$, $k=1, \ldots, N$) associated with the first receiver UE (A1) and a second received signal strength ($RSRP_{k,2}, k=1, \ldots, N$) associated with the second receiver UE (A2). For example, the transmitter UE (B) may determine $RSRP_{k,min}=\min(RSRP_{k,1}, RSRP_{k,2})$, for $k=1, \ldots, N$, and determine the most suitable transmit beam by finding a candidate beam that maximizes $RSRP_{k,min}$ across the plurality of candidate beams ($b_1, \ldots, b_N$), i.e., maximizes the lowest among the first and second received signal strengths.

For example, as shown in FIG. 5, the transmitter UE (B) may determine a transmit beam ($b_3$) that is wider than the first transmit beam ($b_1$) or the second transmit beam ($b_2$). Such a wider transmit beam ($b_3$) may not be best for transmitting the first or second transmissions individually, as the associated received signal strengths ($RSRP_{3,1}$, $RSRP_{3,2}$) may not be the highest possible due to a lower transmit antenna gain associated with the wider transmit beam ($b_3$). However, the wider transmit beam ($b_3$) may allow for simultaneously receiving both transmissions (at the first and second receiver UEs (A1, A2), respectively) with sufficient signal quality for successful decoding, which may not be possible otherwise. FIG. 5 further shows receive beam ($r_1$) of UE A1 and receive beam ($r_2$) of UE A2.

Table 1 below shows a concrete example of RSRP values determined for UE B1 and UE B2. The table is also shown in FIG. 6A.

TABLE 1

| min($RSRP_{k,1}$, $RSRP_{k,2}$) | RSRP for UE B1 (k, 1) | RSRP for UE B2 (k, 2) | Candidate beam (value of k) |
|---|---|---|---|
| 496 | $RSRP_{1,1} = 496$ | $RSRP_{1,2} = 746$ | 1 |
| 78 | $RSRP_{2,1} = 78$ | $RSRP_{2,2} = 878$ | 2 |
| 571 | $RSRP_{3,1} = 744$ | $RSRP_{3,2} = 571$ | 3 |
| 233 | $RSRP_{4,1} = 233$ | $RSRP_{4,2} = 311$ | 4 |
| 510 | $RSRP_{5,1} = 510$ | $RSRP_{5,2} = 800$ | 5 |

As shown in Table 1 and in FIG. 6A, an RSRP for UE B1 is determined for each candidate beam k, for $k=1, 2, 3, 4, 5$. Similarly, an RSRP for UE B2 is determined for each of the candidate beams. A respective minimum is determined for each candidate beam. Then, the beam is selected based on the largest minimum determined. In the example shown by Table 1 and FIG. 6A, the beam of UE A selected for receiving both transmissions from UE B1 and UE B2 is 3 ($k=3$), as 571 is the largest of the determined minimums, even though beam 2 would be better for receiving only the second transmission from UE B2. The selected beam ($k=3$) is selected as the receive beam of UE A for reception from UE B1 and from UE B2.

Table 2 below shows a concrete example of RSRP values determined for UE A1 and UE A2. The table is also shown in FIG. 6B.

TABLE 2

| min($RSRP_{k,1}$, $RSRP_{k,2}$) | RSRP for UE A1 (k, 1) | RSRP for UE A2 (k, 2) | Candidate beam (value of k) |
|---|---|---|---|
| 496 | $RSRP_{1,1} = 496$ | $RSRP_{1,2} = 746$ | 1 |
| 78 | $RSRP_{2,1} = 78$ | $RSRP_{2,2} = 878$ | 2 |
| 571 | $RSRP_{3,1} = 744$ | $RSRP_{3,2} = 571$ | 3 |
| 233 | $RSRP_{4,1} = 233$ | $RSRP_{4,2} = 311$ | 4 |
| 510 | $RSRP_{5,1} = 510$ | $RSRP_{5,2} = 800$ | 5 |

As shown in Table 2 and in FIG. 6B, an RSRP for UE A1 is determined for each candidate beam k, for $k=1, 2, 3, 4, 5$. Similarly, an RSRP for UE A2 is determined for each of the candidate beams. A respective minimum is determined for each candidate beam. Then, the beam is selected based on the largest minimum determined. In the example shown by Table 2 and FIG. 6B, the beam of UE B selected for transmitting both transmissions to UE A1 and UE A2 is 3 ($k=3$), as 571 is the largest of the determined minimums, even though beam 2 would be better for transmitting only the second transmission to UE A2. The selected beam ($k=3$) is selected as the transmit beam of UE B for transmission to UE A1 and to UE A2.

A. Enhanced Receive Beam Selection at Receiver UE (A)

Described herein is a receiver UE (A) comprising a memory storing instructions that cause the receiver UE (A) at least to:

a. determine, based on measurements using a plurality of candidate beams ($a_1, \ldots, a_N$) of the receiver UE (A), a first plurality of received signal strengths ($RSRP_{k,1}$, $k=1, \ldots, N$) associated with a first transmitter UE (B1) and a second plurality of received signal strengths ($RSRP_{k,2}, k=1, \ldots, N$) associated with a second transmitter UE (B2);

b. select, based on the first plurality of received signal strengths ($RSRP_{k,1}, k=1, \ldots, N$), a first candidate beam ($a_1$) for communication with the first transmitter UE (B1);

c. select, based on the second plurality of received signal strengths ($RSRP_{k,2}, k=1, \ldots, N$), a second candidate beam ($a_2$) for communication with the second transmitter UE (B2);

d. determine a first radio resource ($R_1$) expected to be used by the first transmitter UE (B1) for a first radio transmission to the receiver UE (A);

e. determine a second radio resource ($R_2$) expected to be used by the second transmitter UE (B2) for a second radio transmission to the receiver UE (A);

f. determine that the first radio resource ($R_1$) overlaps in time, at least partially, with the second radio resource ($R_2$) and determine that the first candidate beam ($a_1$) does not match the second candidate beam ($a_2$);

g. select a third candidate beam ($a_3$) for reception of both the first and second radio transmissions, wherein the beam selection is based on both the first and second plurality of received signal strengths ($RSRP_{k,1}$, $RSRP_{k,2}, k=1, \ldots, N$);

h. receive the first and second radio transmissions using the third candidate beam ($a_3$).

B. Enhanced Transmit Beam Selection at Transmitter UE (B)

Described herein is a transmitter UE (B) comprising a memory storing instructions that cause the transmitter UE (B) at least to:

a. determine, based on measurements using a plurality of candidate beams ($b_1, \ldots, b_N$) of the transmitter UE (B), a first plurality of received signal strengths ($RSRP_{k,1}$, $k=1, \ldots, N$) associated with a first receiver UE (A1) and a second plurality of received signal strengths ($RSRP_{k,2}, k=1, \ldots, N$) associated with a second receiver UE (A2);

b. select, based on the first plurality of received signal strengths ($RSRP_{k,1}, k=1, \ldots, N$), a first candidate beam ($b_1$) for communication with the first receiver UE (A1);

c. select, based on the second plurality of received signal strengths ($RSRP_{k,2}$, k=1, ..., N), a second candidate beam ($b_2$) for communication with the second receiver UE (A2);

d. determine a first radio resource ($R_1$) for transmitting a first radio transmission to the first receiver UE (A1);

e. determine a second radio resource ($R_2$) for transmitting a second radio transmission to the second receiver UE (A2);

f. determine that the first radio resource ($R_1$) overlaps in time, at least partially, with the second radio resource ($R_2$) and determine that the first candidate beam ($b_1$) does not match the second candidate beam ($b_2$);

g. select a third candidate beam ($b_3$) for transmission of both the first and second radio transmissions, wherein the beam selection is based on both the first and second plurality of received signal strengths ($RSRP_{k,1}$, $RSRP_{k,2}$, k=1, ..., N);

h. transmit the first and second radio transmissions using the third candidate beam ($b_3$).

A. Enhanced Receive Beam Selection at Receiver UE (A)

The receiver UE (A) may perform beam measurements (e.g., as part of initial beam pairing) to determine how suitable each of its candidate beams is for communication with the first transmitter UE (B1) as well as how suitable each of its candidate beams is for communication with the second transmitter UE (B2). For example, the receiver UE (A) may measure a first received signal strength ($RSRP_{k,1}$, k=1, ..., N) for each candidate beam ($a_k$) of a plurality of candidate beams ($a_1$, ..., $a_N$) of the receiver UE (A) based on SL CSI-RS transmitted by the first transmitter UE (B1). Similarly, the receiver UE (A) may measure a second received signal strength ($RSRP_{k,2}$, k=1, ..., N) for each candidate beam ($a_k$) based on SL CSI-RS transmitted by the second transmitter UE (B2). Alternatively, in scenarios where channel reciprocity can be assumed, such beam measurements may be performed by the first and second transmitter UEs (B1, B2) based on SL CSI-RS transmitted by the receiver UE (A) using each candidate beam ($a_k$) and the measurements may then be reported to the receiver UE (A).

On occasion, the receiver UE (A) may be scheduled (or may be expected) to receive multiple SL transmissions simultaneously from multiple transmitter UEs (B1, B2). For example, the first and second transmitter UEs (B1, B2) may transmit SCI reserving, respectively, a first and second radio resource ($R_1$, $R_2$) for transmission of data to the receiver UE (A) which overlap in the time domain (e.g., they occur in a same future slot). Alternatively or additionally, the receiver UE (A) may be expected to receive PSFCH (carrying HARQ feedback) from multiple UEs (B1, B2) on a same PSFCH occasion.

Whenever such a situation occurs, the receiver UE (A) may use any available beam measurements ($RSRP_{k,1}$, $RSRP_{k,2}$, k=1, ..., N) to select a single common receive beam ($a_3$) for simultaneous reception of the expected multiple SL transmissions such that the corresponding received signal strengths are large enough for successful reception of each of the multiple SL transmissions, rather than only one of them.

The plurality of candidate beams ($a_1$, ..., $a_N$) may include a plurality of beamwidths. For example, wider candidate beams may allow for simultaneous reception of SL transmissions from directions that are further apart (i.e., with a wider angular separation).

In one embodiment, the receiver UE (A) may determine, for each candidate beam ($a_k$) of the plurality of candidate beams ($a_1$, ..., $a_N$), a minimum received signal strength ($RSRP_{k,min}$) among the first and second received signal strengths, i.e., $RSRP_{k,min}$=min($RSRP_{k,1}$, $RSRP_{k,2}$), for k=1, ..., N, and determine a candidate beam that maximizes the minimum received signal strength ($RSRP_{k,min}$, k=1, ..., N) across the plurality of candidate beams ($a_1$, ..., $a_N$). In this way, the receiver UE (A) may select a single common receive beam that allows for successful reception of both the first and second transmissions, even though the resulting receive gain for each transmission may be lower than it might have been if separate receive beams had been selected for receiving each transmission individually.

In another embodiment, the receiver UE (A) may determine, for each candidate beam ($a_k$) of the plurality of candidate beams ($a_1$, ..., $a_N$), whether the first and second received signal strengths ($RSRP_{k,1}$, $RSRP_{k,2}$, k=1, ..., N) are each above a corresponding first and second threshold ($Th_1$, $Th_2$). The receiver UE (A) may then, for example, discard or exclude any candidate beams for which at least one of the received signal strengths ($RSRP_{k,1}$, $RSRP_{k,2}$, k=1, ..., N) is below the corresponding threshold ($Th_1$, $Th_2$).

The first and second threshold ($Th_1$, $Th_2$) may each depend on a corresponding first and second modulation and coding scheme ($MCS_1$, $MCS_2$) to be used, respectively, for the first and second transmission (e.g., as indicated in received SCI). A more robust transmission (i.e., lower MCS) may accommodate a lower receive gain (e.g., as a result of a wider receive beam being selected or a receive beam not pointing directly at the corresponding transmitter UE). In some cases, the first and second threshold may be the same (i.e., $Th_1$=$Th_2$).

Receive beam selection may be further based on transmission priority (e.g., as indicated in received SCI). For example, if the first priority ($p_1$) of the first transmission and the second priority ($p_2$) of the second transmission are the same, the receiver UE (A) may select a wider receive beam to be able to simultaneously receive both transmissions. On the other hand, if the first transmission has top priority ($p_1$=1) while the second transmission has lowest priority ($p_2$=8), the receiver UE (A) may ignore the second transmission and select a narrow receive beam pointing at the first transmitter UE (B1) in order to maximize the corresponding received signal quality.

In some embodiments, the receiver UE (A) may determine an angular distance (θ) between a first expected angle-of-arrival ($AoA_1$) of the first transmission and a second expected angle-of-arrival ($AoA_2$) of the second transmission. For example, if the angular distance (θ) is very small, it may be worthwhile to select a slightly wider receive beam for simultaneous reception of both transmissions at the cost of a slightly lower receive gain. On the other hand, if the angular distance (θ) is very large, selecting a very wide receive beam may result in a severe reduction of received signal quality. Thus, in such cases, the receiver UE (A) may prefer to focus on receiving either the first or second transmission (e.g., that which has higher priority) with a narrower receive beam.

In some embodiments, the receiver UE (A) may determine, for each candidate beam ($a_k$) of the plurality of candidate beams ($a_1$, ..., $a_N$), a first expected interference ($RSSI_{k,1}$, k=1, ..., N) in the first radio resource ($R_1$) and/or a second expected interference ($RSSI_{k,2}$, k=1, ..., N) in the second radio resource ($R_2$). For example, a very wide receive beam may be exposed to higher interference than a not-so-wide receive beam. This may be taken into account when selecting the common receive beam.

B. Enhanced Transmit Beam Selection at Transmitter UE (B)

The transmitter UE (B) may perform beam measurements (e.g., as part of initial beam pairing) to determine how suitable each of its candidate beams is for communication with the first receiver UE (A1) as well as how suitable each of its candidate beams is for communication with the second receiver UE (A2). For example, in scenarios where channel reciprocity can be assumed, the transmitter UE (B) may measure a first received signal strength ($RSRP_{k,1}$, k=1, . . . , N) for each candidate beam ($b_k$) of a plurality of candidate beams ($b_1$, . . . , $b_N$) of the transmitter UE (B) based on SL CSI-RS transmitted by the first receiver UE (A1). Similarly, the transmitter UE (B) may measure a second received signal strength ($RSRP_{k,2}$, k=1, . . . , N) for each candidate beam ($b_k$) based on SL CSI-RS transmitted by the second receiver UE (A2). Alternatively, such beam measurements may be performed by the first and second receiver UEs (A1, A2) based on SL CSI-RS transmitted by the transmitter UE (B) using each candidate beam ($b_k$) and the measurements may then be reported to the transmitter UE (B).

On occasion, the transmitter UE (B) may be scheduled (or may be expected) to transmit multiple SL transmissions simultaneously to multiple receiver UEs (A1, A2). For example, the transmitter UE (B) may transmit a first SCI reserving a first radio resource ($R_1$) for transmission of data to the first receiver UE (A1) and may subsequently transmit a second SCI reserving a second radio resource ($R_2$) for transmission of data to the second receiver UE (A2) which overlaps in the time domain with the first radio resource ($R_1$) (e.g., they occur in a same future slot). Alternatively or additionally, the transmitter UE (B) may be expected to transmit PSFCH (carrying HARQ feedback) to multiple UEs (A1, A2) on a same PSFCH occasion.

Whenever such a situation occurs, the transmitter UE (B) may use any available beam measurements ($RSRP_{k,1}$, $RSRP_{k,2}$, k=1, . . . , N) to select a single common transmit beam ($b_3$) for simultaneous transmission of the expected multiple SL transmissions such that the corresponding received signal strengths are large enough for successful reception of each of the multiple SL transmissions, rather than only one of them.

The plurality of candidate beams ($b_1$, . . . , $b_N$) may include a plurality of beamwidths. For example, wider candidate beams may allow for simultaneous transmission of SL transmissions in directions that are further apart (i.e., with a wider angular separation).

In one embodiment, the transmitter UE (B) may determine, for each candidate beam ($b_k$) of the plurality of candidate beams ($b_1$, . . . , $b_N$), a minimum received signal strength ($RSRP_{k,min}$) among the first and second received signal strengths, i.e., $RSRP_{k,min}=\min(RSRP_{k,1}, RSRP_{k,2})$, for k=1, . . . , N, and determine a candidate beam that maximizes the minimum received signal strength ($RSRP_{k,min}$, k=1, . . . , N) across the plurality of candidate beams ($b_1$, . . . , $b_N$). In this way, the transmitter UE (B) may select a single common transmit beam that allows for successful reception of both the first and second transmissions, even though the resulting transmit gain for each transmission may be lower than it might have been if separate transmit beams had been selected for transmitting each transmission individually.

In another embodiment, the transmitter UE (B) may determine, for each candidate beam ($b_k$) of the plurality of candidate beams ($b_1$, . . . , $b_N$), whether the first and second received signal strengths ($RSRP_{k,1}$, $RSRP_{k,2}$, k=1, . . . , N) are each above a corresponding first and second threshold ($Th_1$, $Th_2$). The transmitter UE (B) may then, for example, discard or exclude any candidate beams for which at least one of the received signal strengths ($RSRP_{k,1}$, $RSRP_{k,2}$, k=1, . . . , N) is below the corresponding threshold ($Th_1$, $Th_2$).

The first and second threshold ($Th_1$, $Th_2$) may each depend on a corresponding first and second modulation and coding scheme ($MCS_1$, $MCS_2$) to be used, respectively, for the first and second transmission (e.g., as indicated in transmitted SCI). A more robust transmission (i.e., lower MCS) may accommodate a lower transmit gain (e.g., as a result of a wider transmit beam being selected or a transmit beam not pointing directly at the corresponding receiver UE). In some cases, the first and second threshold may be the same (i.e., $Th_1=Th_2$).

Transmit beam selection may be further based on transmission priority (e.g., as indicated in transmitted SCI). For example, if the first priority ($p_1$) of the first transmission and the second priority ($p_2$) of the second transmission are the same, the transmitter UE (B) may select a wider transmit beam to be able to simultaneously transmit both transmissions. On the other hand, if the first transmission has top priority ($p_1=1$) while the second transmission has lowest priority ($p_2=8$), the transmitter UE (B) may drop the second transmission and select a narrow transmit beam pointing at the first receiver UE (A1) in order to maximize the corresponding received signal quality.

In some embodiments, the transmitter UE (B) may determine an angular distance ($\theta$) between a first expected angle-of-departure ($AoD_1$) of the first transmission and a second expected angle-of-departure ($AoD_2$) of the second transmission. For example, if the angular distance ($\theta$) is very small, it may be worthwhile to select a slightly wider transmit beam for simultaneous transmission of both transmissions at the cost of a slightly lower transmit gain. On the other hand, if the angular distance ($\theta$) is very large, selecting a very wide transmit beam may result in a severe reduction of received signal quality. Thus, in such cases, the transmitter UE (B) may prefer to focus on transmitting either the first or second transmission (e.g., that which has higher priority) with a narrower transmit beam.

Advantages and Technical Effects of the Herein Described Scheme

The proposed scheme is beneficial whenever SL is transmitted or received using beamforming by UEs that are not capable of transmitting or receiving simultaneously on multiple beams. By carefully selecting the transmit or receive beam (e.g., selecting a wider transmit or receive beamwidth), UEs can accommodate simultaneous transmission or reception to/from multiple directions, allowing for more flexible radio resource selection (or transmission scheduling) as transmissions or receptions to/from UEs in different directions are not constrained to be time-orthogonal. This may lead to increased system throughput and lower latency.

Figure 7:
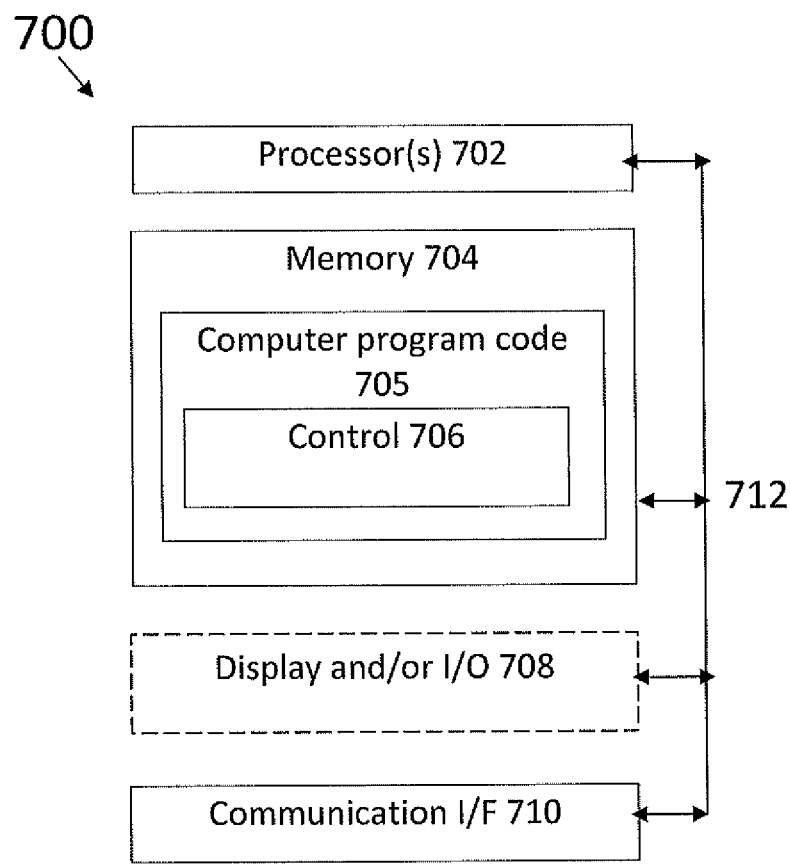
FIG. 7 is an example apparatus configured to implement the examples described herein.

FIG. 7 is an example apparatus 700, which may be implemented in hardware, configured to implement the examples described herein. The apparatus 700 comprises at least one processor 702 (e.g. an FPGA and/or CPU), at least one memory 704 including computer program code 705, the computer program code 705 having instructions, wherein the at least one memory 704 and the computer program code 705 are configured to, with the at least one processor 702, cause the apparatus 700 to implement circuitry, a process, component, module, or function (collectively control 706) to implement the examples described herein, including enhanced beam selection for NR sidelink communication in FR2. The memory 704 may be a non-transitory memory, a transitory memory, a volatile memory (e.g. RAM), or a non-volatile memory (e.g. ROM).

The apparatus 700 optionally includes a display and/or I/O interface 708 that may be used to display aspects or a status of the methods described herein (e.g., as one of the methods is being performed or at a subsequent time), or to receive input from a user such as with using a keypad, camera, touchscreen, touch area, microphone, biometric recognition, one or more sensors, etc. The apparatus 700 includes one or more communication e.g. network (N/W) interfaces (I/F(s)) 710. The communication I/F(s) 710 may be wired and/or wireless and communicate over the Internet/other network(s) via any communication technique. The communication I/F(s) 710 may comprise one or more transmitters and one or more receivers. The communication I/F(s) 710 may comprise standard well-known components such as an amplifier, filter, frequency-converter, (de)modulator, and encoder/decoder circuitries and one or more antennas.

The apparatus 700 to implement the functionality of control 706 may be UE 110, RAN node 170 (e.g. gNB), or network element(s) 190. Thus, processor 702 may correspond to processor(s) 120, processor(s) 152 and/or processor(s) 175, memory 704 may correspond to memory(ies) 125, memory(ies) 155 and/or memory(ies) 171, computer program code 705 may correspond to computer program code 123, module 140-1, module 140-2, and/or computer program code 153, module 150-1, module 150-2, and/or computer program code 173, and communication I/F(s) 710 may correspond to transceiver 130, antenna(s) 128, transceiver 160, antenna(s) 158, N/W I/F(s) 161, and/or N/W I/F(s) 180. Alternatively, apparatus 700 may not correspond to either of UE 110, RAN node 170, or network element(s) 190, as apparatus 700 may be part of a self-organizing/optimizing network (SON) node, such as in a cloud.

The apparatus 700 may also be distributed throughout the network (e.g. 100) including within and between apparatus 700 and any network element (such as a network control element (NCE) 190 and/or the RAN node 170 and/or the UE 110).

Interface 712 enables data communication between the various items of apparatus 700, as shown in FIG. 7. For example, the interface 712 may be one or more buses such as address, data, or control buses, and may include any interconnection mechanism, such as a series of lines on a motherboard or integrated circuit, fiber optics or other optical communication equipment, and the like. Computer program code (e.g. instructions) 705, including control 706 may comprise object-oriented software configured to pass data or messages between objects within computer program code 705. The apparatus 700 need not comprise each of the features mentioned, or may comprise other features as well.

Figure 8:
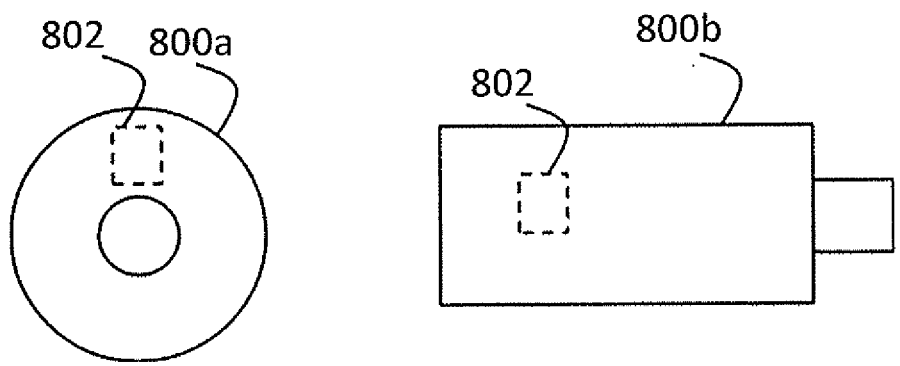
FIG. 8 shows a representation of an example of non-volatile memory media.

FIG. 8 shows a schematic representation of non-volatile memory media 800a (e.g. computer/compact disc (CD) or digital versatile disc (DVD)) and 800b (e.g. universal serial bus (USB) memory stick) storing instructions and/or parameters 802 which when executed by a processor allows the processor to perform one or more of the steps of the methods described herein.

Figure 9:
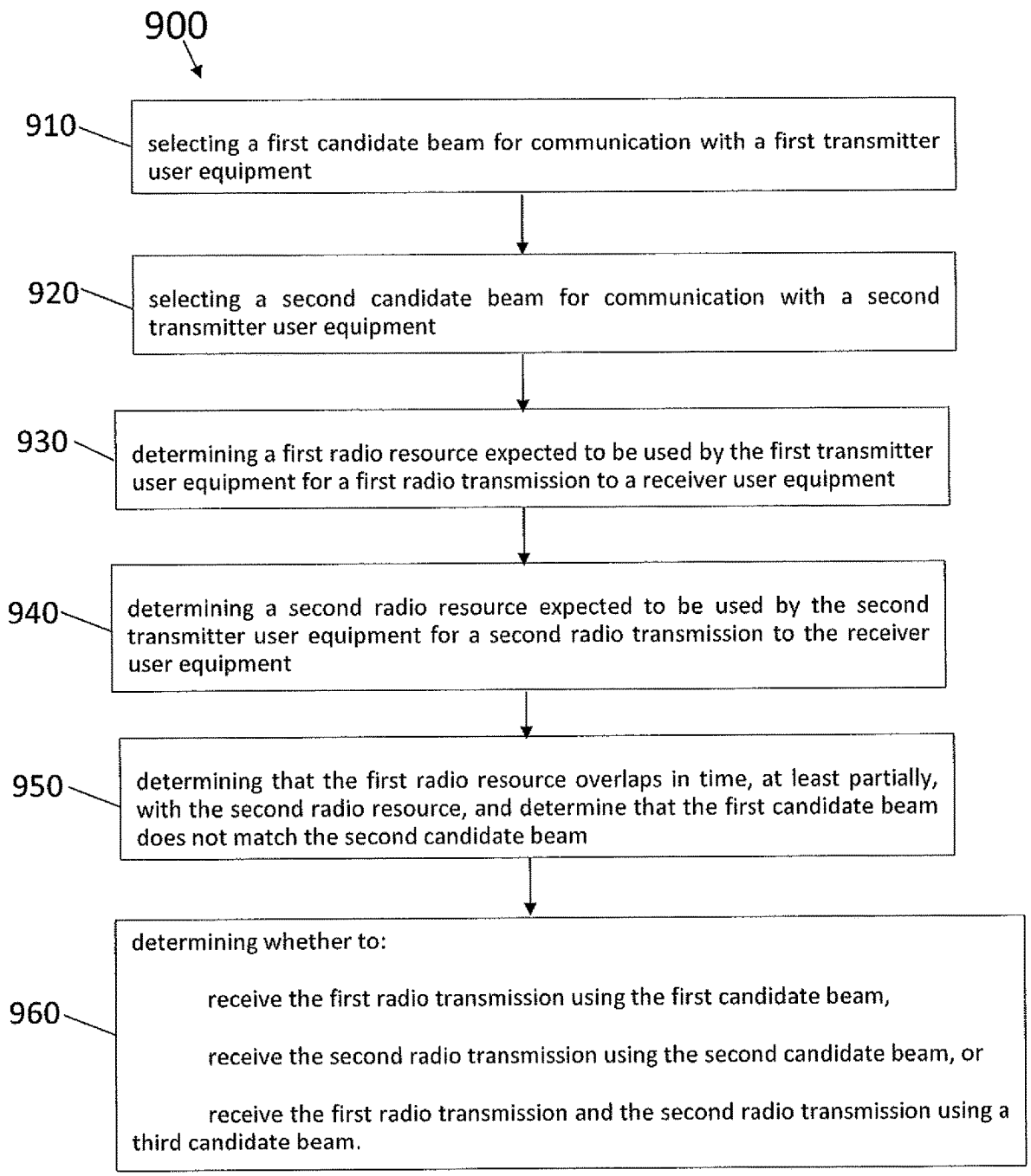
FIG. 9 is an example method implementing the examples described herein.

FIG. 9 is an example method 900 to implement the example embodiments described herein. At 910, the method includes selecting a first candidate beam for communication with a first transmitter user equipment. At 920, the method includes selecting a second candidate beam for communication with a second transmitter user equipment. At 930, the method includes determining a first radio resource expected to be used by the first transmitter user equipment for a first radio transmission to a receiver user equipment. At 940, the method includes determining a second radio resource expected to be used by the second transmitter user equipment for a second radio transmission to the receiver user equipment. At 950, the method includes determining that the first radio resource overlaps in time, at least partially, with the second radio resource, and determine that the first candidate beam does not match the second candidate beam. At 960, the method includes determining whether to: receive the first radio transmission using the first candidate beam, receive the second radio transmission using the second candidate beam, or receive the first radio transmission and the second radio transmission using a third candidate beam. Method 900 may be performed with UE A (RX), UE 110, or apparatus 700.

Figure 10:
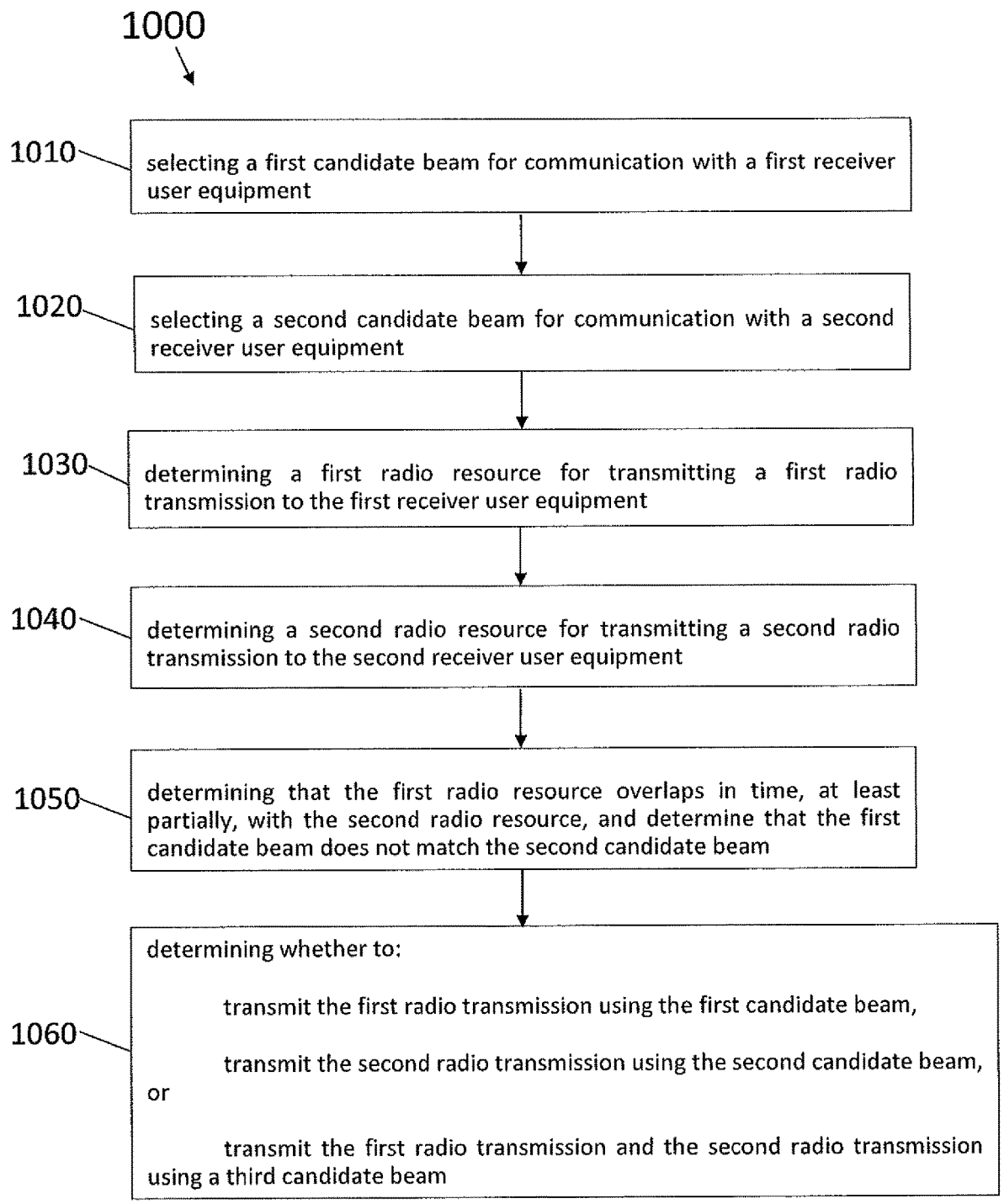
FIG. 10 is an example method implementing the examples described herein.

FIG. 10 is an example method 1000 to implement the example embodiments described herein. At 1010, the method includes selecting a first candidate beam for communication with a first receiver user equipment. At 1020, the method includes selecting a second candidate beam for communication with a second receiver user equipment. At 1030, the method includes determining a first radio resource for transmitting a first radio transmission to the first receiver user equipment. At 1040, the method includes determining a second radio resource for transmitting a second radio transmission to the second receiver user equipment. At 1050, the method includes determining that the first radio resource overlaps in time, at least partially, with the second radio resource, and determine that the first candidate beam does not match the second candidate beam. At 1060, the method includes determining whether to: transmit the first radio transmission using the first candidate beam, transmit the second radio transmission using the second candidate beam, or transmit the first radio transmission and the second radio transmission using a third candidate beam. Method 1000 may be performed with UE B (TX), UE 110, or apparatus 700.

Figure 11:
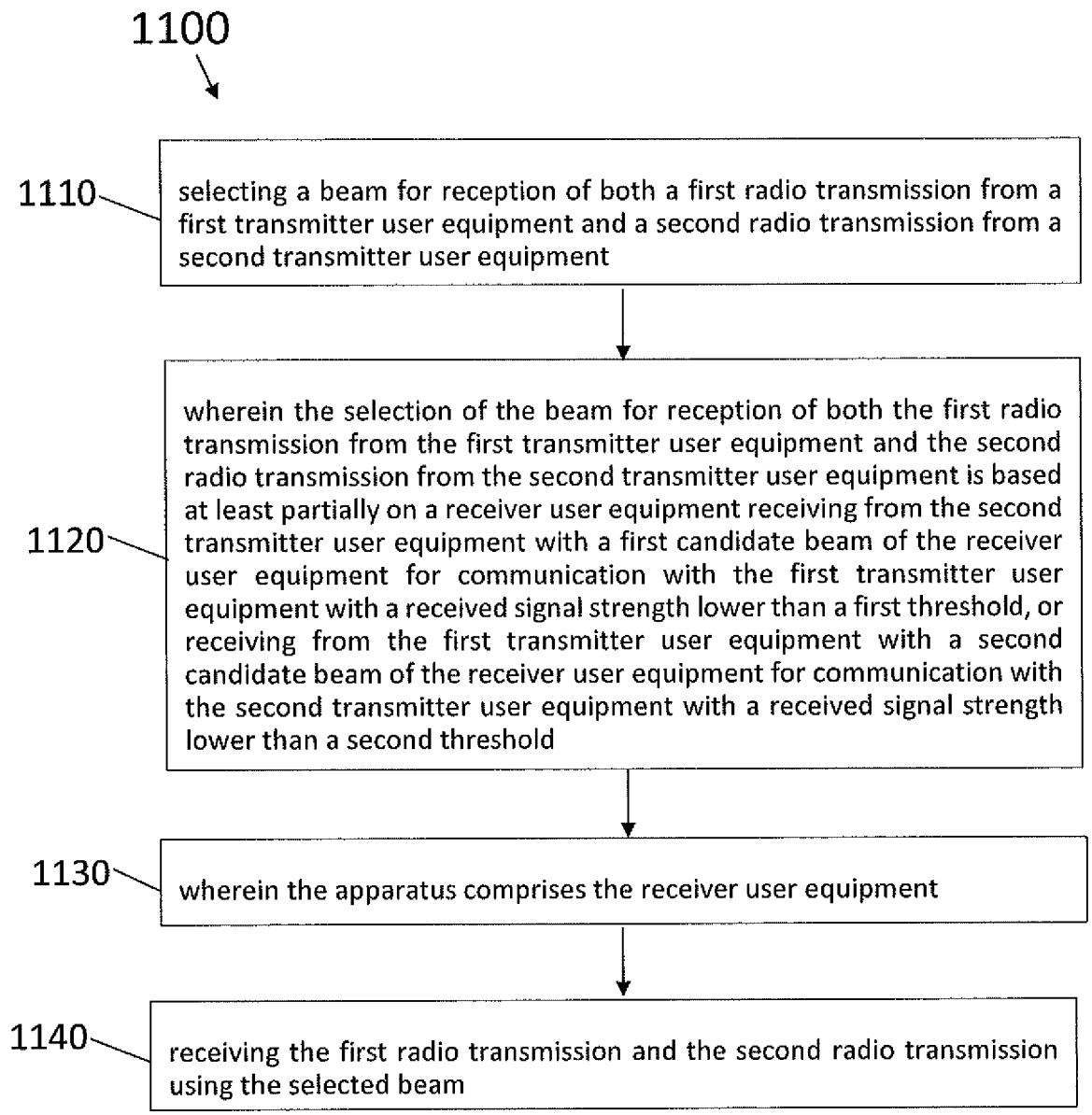
FIG. 11 is an example method implementing the examples described herein.

FIG. 11 is an example method 1100 to implement the example embodiments described herein. At 1110, the method includes selecting a beam for reception of both a first radio transmission from a first transmitter user equipment and a second radio transmission from a second transmitter user equipment. At 1120, the method includes wherein the selection of the beam for reception of both the first radio transmission from the first transmitter user equipment and the second radio transmission from the second transmitter user equipment is based at least partially on a receiver user equipment receiving from the second transmitter user equipment with a first candidate beam of the receiver user equipment for communication with the first transmitter user equipment with a received signal strength lower than a first threshold, or receiving from the first transmitter user equipment with a second candidate beam of the receiver user equipment for communication with the second transmitter user equipment with a received signal strength lower than a second threshold. At 1130, the method includes wherein the apparatus comprises the receiver user equipment. At 1140, the method includes receiving the first radio transmission and the second radio transmission using the selected beam. Method 1100 may be performed with UE A (RX), UE 110, or apparatus 700.

Figure 12:
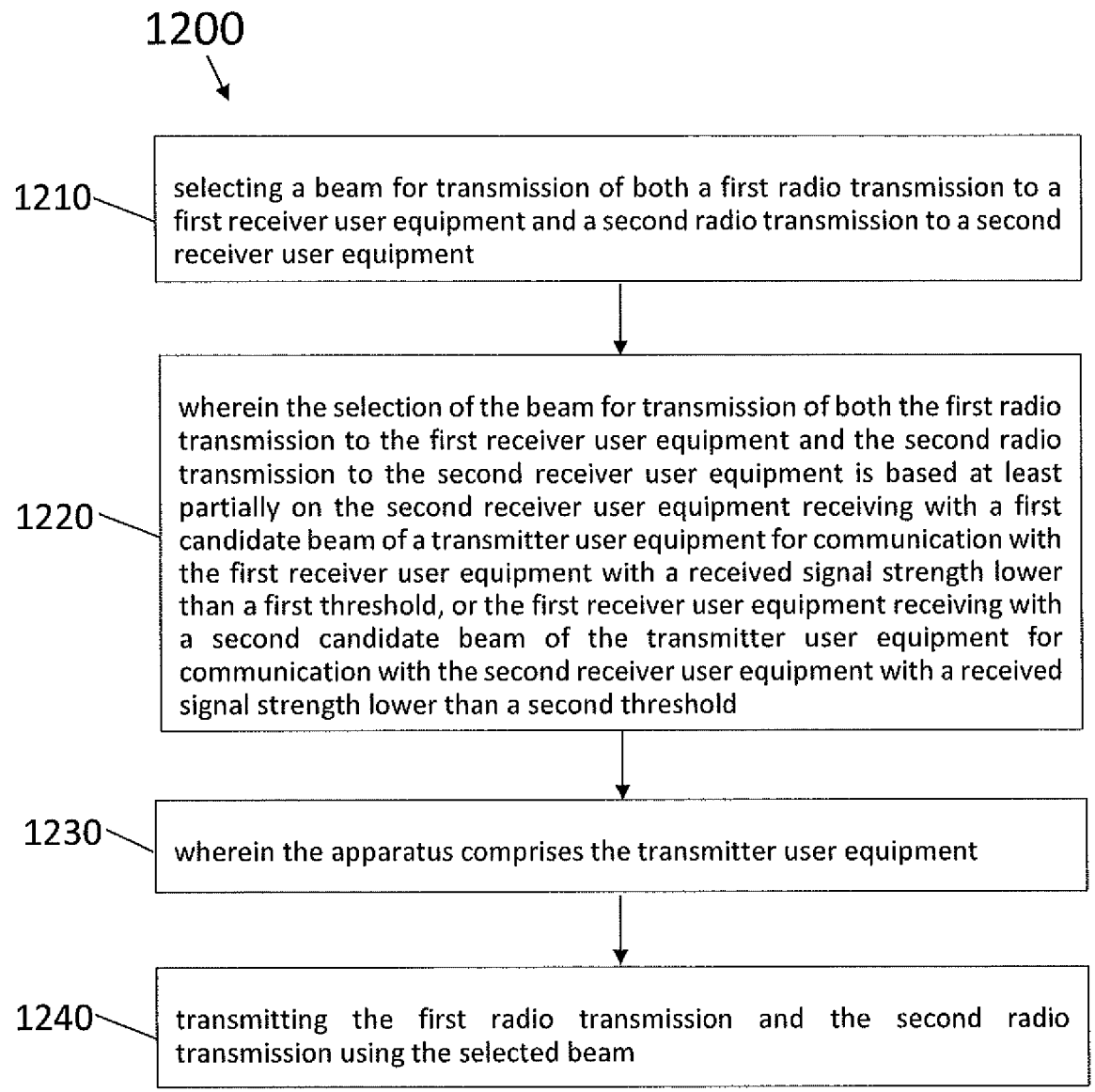
FIG. 12 is an example method implementing the examples described herein.

FIG. 12 is an example method 1200 to implement the example embodiments described herein. At 1210, the method includes selecting a beam for transmission of both a first radio transmission to a first receiver user equipment and a second radio transmission to a second receiver user equipment. At 1220, the method includes wherein the selection of the beam for transmission of both the first radio transmission to the first receiver user equipment and the second radio transmission to the second receiver user equipment is based at least partially on the second receiver user equipment receiving with a first candidate beam of a transmitter user equipment for communication with the first receiver user equipment with a received signal strength lower than a first threshold, or the first receiver user equipment receiving with a second candidate beam of the transmitter user equipment for communication with the second receiver user equipment with a received signal strength lower than a second threshold. At 1230, the method includes wherein the apparatus comprises the transmitter user equipment. At 1240, the method includes transmitting the first radio transmission and the second radio transmission using the selected beam. Method 1200 may be performed with UE B (TX), UE 110, or apparatus 700.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memory(ies) as described herein may be implemented using any suitable data storage technology, such as semiconductor based memory devices, flash memory, magnetic memory devices and systems, optical memory devices and systems, non-transitory memory, transitory memory, fixed memory and removable memory. The memory(ies) may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In the figures, arrows between individual blocks represent operational couplings there-between as well as the direction of data flows on those couplings.

It should be understood that the foregoing description is only illustrative. Various alternatives and modifications may be devised by those skilled in the art. For example, features recited in the various dependent claims could be combined with each other in any suitable combination(s). In addition, features from different example embodiments described above could be selectively combined into a new example embodiment. Accordingly, this description is intended to embrace all such alternatives, modifications and variances which fall within the scope of the appended claims.

The following acronyms and abbreviations that may be found in the specification and/or the drawing figures are given as follows (the abbreviations and acronyms may be appended with each other or with other characters using e.g. a dash, hyphen, or number):

| | |
|---|---|
| 4G | fourth generation |
| 5G | fifth generation |
| 5GC | 5G core network |
| AMF | access and mobility management function |
| AoA | angle of arrival |
| AoD | angle of departure |
| ASIC | application-specific integrated circuit |
| CD | compact/computer disc |
| CPU | central processing unit |
| CSI | channel state information |
| CSI-RS | channel state information reference signal |
| CU | central unit or centralized unit |
| DSP | digital signal processor |
| DVD | digital versatile disc |
| eNB | evolved Node B (e.g., an LTE base station) |
| EN-DC | E-UTRAN new radio - dual connectivity |
| en-gNB | node providing NR user plane and control plane protocol terminations towards the UE, and acting as a secondary node in EN-DC |
| E-UTRA | evolved universal terrestrial radio access, i.e., the LTE radio access technology |
| E-UTRAN | E-UTRA network |
| F1 | interface between the CU and the DU |
| FPGA | field-programmable gate array |
| FR | frequency range |
| gNB | base station for 5G/NR, i.e., a node providing NR user plane and control plane protocol terminations towards the UE, and connected via the NG interface to the 5GC |
| HARQ | hybrid automatic repeat request |
| IAB | integrated access and backhaul |
| I/F | interface |
| I/O | input/output |
| LMF | location management function |
| LTE | long term evolution (4G) |
| MAC | medium access control |
| MAC CE | medium access control control element |
| MBAA | multi-beam adaptive array |
| MCS | modulation and coding scheme |
| MME | mobility management entity |
| MRO | mobility robustness optimization |
| NCE | network control element |
| ng or NG | new generation |
| ng-eNB | new generation eNB |
| NG-RAN | new generation radio access network |
| NR | new radio |
| N/W | network |
| PDA | personal digital assistant |
| PDCP | packet data convergence protocol |
| PHY | physical layer |
| PSFCH | physical sidelink feedback channel |
| R | release |
| RAM | random access memory |
| RAN | radio access network |
| RLC | radio link control |
| ROM | read-only memory |
| RRC | radio resource control |
| RSRP | reference signal received power |
| RSSI | received signal strength indicator |
| RU | radio unit |
| Rx or RX | receiver or reception |
| SCI | sidelink control information |
| SGW | serving gateway |
| SL | sidelink |
| SMF | session management function |
| SON | self-organizing/optimizing network |
| Th | threshold |
| TRP | transmission reception point |
| TS | technical specification |
| Tx or TX | transmitter or transmission |
| UAV | unmanned aerial vehicle |
| UE | user equipment (e.g., a wireless, typically mobile device) |

-continued

| | |
|---|---|
| UL | uplink |
| UPF | user plane function |
| USB | universal serial bus |
| Uu | air interface |
| X2 | network interface between RAN nodes and between RAN and the core network |
| Xn | network interface between NG-RAN nodes |

What is claimed is:

1. An apparatus comprising:
   at least one processor; and
   at least one memory storing instructions that, when executed by the at least one processor, cause the apparatus at least to:
   select a first candidate beam for communication with a first transmitter user equipment;
   select a second candidate beam for communication with a second transmitter user equipment;
   determine a first radio resource expected to be used by the first transmitter user equipment for a first radio transmission to a receiver user equipment;
   determine a second radio resource expected to be used by the second transmitter user equipment for a second radio transmission to the receiver user equipment;
   determine that the first radio resource overlaps in time, at least partially, with the second radio resource, and determine that the first candidate beam does not match the second candidate beam;
   determine whether to:
      receive the first radio transmission using the first candidate beam,
      receive the second radio transmission using the second candidate beam, or
      receive the first radio transmission and the second radio transmission using a third candidate beam; and
   select a beam for reception of the first radio transmission and the second radio transmission based at least partially on at least one of:
      a first priority of the first radio transmission and a second priority of the second radio transmission;
      an angular distance between a first expected angle-of-arrival of the first radio transmission and a second expected angle-of-arrival of the second radio transmission; or
      a first expected interference in the first radio resource expected to be used by the first transmitter user equipment or a second expected interference in the second radio resource expected to be used by the second transmitter user equipment.

2. The apparatus of claim 1, wherein the instructions, when executed by the at least one processor, cause the apparatus to:
   determine to receive the first radio transmission from the first transmitter user equipment using the first candidate beam when the first radio transmission of the first transmitter user equipment has a higher priority than the second radio transmission of the second transmitter user equipment; and
   determine to receive the second radio transmission from the second transmitter user equipment using the second candidate beam when the second radio transmission of the second transmitter user equipment has a higher priority than the first radio transmission of the first transmitter user equipment.

3. The apparatus of claim 1, wherein the instructions, when executed by the at least one processor, cause the apparatus to:
   determine, based on measurements using a plurality of candidate beams of the receiver user equipment, a first plurality of received signal strengths associated with the first transmitter user equipment and a second plurality of received signal strengths associated with the second transmitter user equipment; and
   select the third candidate beam for reception of both the first radio transmission from the first transmitter user equipment and the second radio transmission from the second transmitter user equipment, wherein the beam selection is based on both the first plurality of received signal strengths and the second plurality of received signal strengths.

4. The apparatus of claim 3, wherein the instructions, when executed by the at least one processor, cause the apparatus at least to:
   determine, for the plurality of candidate beams, a respective plurality of smaller received signal strengths of a respective first received signal strength of the first plurality of received signal strengths associated with the first transmitter user equipment and a respective second received signal strength of the second plurality of received signal strengths associated with the second transmitter user equipment;
   determine a larger received signal strength of the plurality of smaller received signal strengths; and
   select a beam for reception of both the first radio transmission from the first transmitter user equipment and the second radio transmission from the second transmitter user equipment that is associated with the larger received signal strength of the plurality of smaller received signal strengths.

5. The apparatus of claim 1, wherein the instructions, when executed by the at least one processor, cause the apparatus at least to:
   select the third candidate beam for reception of both the first radio transmission from the first transmitter user equipment and the second radio transmission from the second transmitter user equipment, based at least partially on the determination that the first candidate beam does not match the second candidate beam.

6. The apparatus of claim 1, wherein the instructions, when executed by the at least one processor, cause the apparatus at least to:
   select the third candidate beam for reception of both the first radio transmission from the first transmitter user equipment and the second radio transmission from the second transmitter user equipment, based at least partially on the determination that the first radio resource overlaps in time, at least partially, with the second radio resource.

7. The apparatus of claim 1, wherein the instructions, when executed by the at least one processor, cause the apparatus at least to:
   select the third candidate beam for reception of both the first radio transmission from the first transmitter user equipment and the second radio transmission from the second transmitter user equipment, based at least partially on the receiver user equipment being incapable of simultaneously receiving with both the first candidate beam and the second candidate beam.

8. An apparatus comprising:
at least one processor; and
at least one memory storing instructions that, when executed by the at least one processor, cause the apparatus at least to:
select a first candidate beam for communication with a first receiver user equipment;
select a second candidate beam for communication with a second receiver user equipment;
determine a first radio resource for transmitting a first radio transmission to the first receiver user equipment;
determine a second radio resource for transmitting a second radio transmission to the second receiver user equipment;
determine that the first radio resource overlaps in time, at least partially, with the second radio resource, and determine that the first candidate beam does not match the second candidate beam;
determine whether to:
transmit the first radio transmission using the first candidate beam,
transmit the second radio transmission using the second candidate beam, or
transmit the first radio transmission and the second radio transmission using
a third candidate beam; and
select a beam for transmission of the first radio transmission and the second radio transmission based at least partially on at least one of:
a first priority of the first radio transmission and a second priority of the second radio transmission;
an angular distance between a first expected angle-of-departure of the first radio transmission and a second expected angle-of-departure of the second radio transmission; or
a first expected interference in the first radio resource for transmitting the first radio transmission to the first receiver user equipment or a second expected interference in the second radio resource for transmitting the second radio transmission to the second receiver user equipment.

9. The apparatus of claim 8, wherein the instructions, when executed by the at least one processor, cause the apparatus to:
determine to transmit the first radio transmission to the first receiver user equipment using the first candidate beam when the first radio transmission to the first receiver user equipment has a higher priority than the second radio transmission to the second receiver user equipment; and
determine to transmit the second radio transmission to the second receiver user equipment using the second candidate beam when the second radio transmission to the second receiver user equipment has a higher priority than the first radio transmission to the first receiver user equipment.

10. The apparatus of claim 8, wherein the instructions, when executed by the at least one processor, cause the apparatus to:
determine, based on measurements using a plurality of candidate beams of a transmitter user equipment, a first plurality of received signal strengths associated with the first receiver user equipment and a second plurality of received signal strengths associated with the second receiver user equipment; and
select the third candidate beam for transmission of both the first radio transmission to the first receiver user equipment and the second radio transmission to the second receiver user equipment, wherein the beam selection is based on both the first plurality of received signal strengths and the second plurality of received signal strengths.

11. The apparatus of claim 10, wherein the instructions, when executed by the at least one processor, cause the apparatus at least to:
determine, for the plurality of candidate beams, a respective plurality of smaller received signal strengths of a respective first received signal strength of the first plurality of received signal strengths associated with the first receiver user equipment and a respective second received signal strength of the second plurality of received signal strengths associated with the second receiver user equipment;
determine a larger received signal strength of the plurality of smaller received signal strengths; and
select a beam for transmission of both the first radio transmission to the first receiver user equipment and the second radio transmission to the second receiver user equipment that is associated with the larger received signal strength of the plurality of smaller received signal strengths.

12. The apparatus of claim 8, wherein the instructions, when executed by the at least one processor, cause the apparatus at least to:
select the third candidate beam for transmission of both the first radio transmission to the first receiver user equipment and the second radio transmission to the second receiver user equipment, based at least partially on the determination that the first candidate beam does not match the second candidate beam.

13. The apparatus of claim 8, wherein the instructions, when executed by the at least one processor, cause the apparatus at least to:
select the third candidate beam for transmission of both the first radio transmission to the first receiver user equipment and the second radio transmission to the second receiver user equipment, based at least partially on the determination that the first radio resource overlaps in time, at least partially, with the second radio resource.

14. The apparatus of claim 8, wherein the instructions, when executed by the at least one processor, cause the apparatus at least to:
select the third candidate beam for transmission of both the first radio transmission to the first receiver user equipment and the second radio transmission to the second receiver user equipment, based at least partially on the transmitter user equipment being incapable of simultaneously transmitting with both the first candidate beam and the second candidate beam.

15. An apparatus comprising:
at least one processor; and
at least one memory storing instructions that, when executed by the at least one processor, cause the apparatus at least to:
select a beam for reception of both a first radio transmission from a first transmitter user equipment and a second radio transmission from a second transmitter user equipment;
wherein the selection of the beam for reception of both the first radio transmission from the first transmitter user equipment and the second radio transmission from the second transmitter user equipment is based at least partially on a receiver user equipment receiving from the second transmitter user equipment with a first candidate beam of the receiver user equipment for communication with the first transmitter user equipment with a received signal strength lower than a first threshold, or receiving from the first transmitter user equipment with a second candidate beam of the receiver user equipment for communication with the second transmitter user equipment with a received signal strength lower than a second threshold;

wherein the apparatus comprises the receiver user equipment; and receive the first radio transmission and the second radio transmission using the selected beam.

16. The apparatus of claim 15, wherein the instructions, when executed by the at least one processor, cause the apparatus at least to:

determine, based on measurements using a plurality of candidate beams of the receiver user equipment, a first plurality of received signal strengths associated with the first transmitter user equipment and a second plurality of received signal strengths associated with the second transmitter user equipment;

wherein the beam selection is based on both the first plurality of received signal strengths and the second plurality of received signal strengths.

17. The apparatus of claim 16, wherein the instructions, when executed by the at least one processor, cause the apparatus at least to:

determine, for the plurality of candidate beams, a respective plurality of smaller received signal strengths of a respective first received signal strength of the first plurality of received signal strengths associated with the first transmitter user equipment and a respective second received signal strength of the second plurality of received signal strengths associated with the second transmitter user equipment;

determine a larger received signal strength of the plurality of smaller received signal strengths; and wherein the beam selected for reception of both the first radio transmission from the first transmitter user equipment and the second radio transmission from the second transmitter user equipment is associated with the larger received signal strength of the plurality of smaller received signal strengths.

18. The apparatus of claim 15, wherein the selection of the beam for reception is based at least partially on at least one of:

a first priority of the first radio transmission and a second priority of the second radio transmission;

an angular distance between a first expected angle-of-arrival of the first radio transmission and a second expected angle-of-arrival of the second radio transmission; or a first expected interference in a first radio resource associated with the first radio transmission or a second expected interference in a second radio resource associated with the second radio transmission.

\* \* \* \* \*